US012650778B2

(12) United States Patent
Ono et al.

(10) Patent No.: US 12,650,778 B2
(45) Date of Patent: Jun. 9, 2026

(54) STORAGE SYSTEM AND CONTROL METHOD FOR STORAGE SYSTEM

(71) Applicant: Hitachi Vantara, Ltd., Yokohama (JP)

(72) Inventors: Taisuke Ono, Tokyo (JP); Yoshinori Ohira, Tokyo (JP); Takahiro Yamamoto, Tokyo (JP); Shintaro Ito, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/830,805

(22) Filed: Sep. 11, 2024

(65) Prior Publication Data

US 2025/0328258 A1 Oct. 23, 2025

(30) Foreign Application Priority Data

Apr. 19, 2024 (JP) ................................. 2024-068558

(51) Int. Cl.
*G06F 12/00* (2006.01)
*G06F 3/06* (2006.01)
*G06F 12/0868* (2016.01)
(52) U.S. Cl.
CPC .......... *G06F 3/0619* (2013.01); *G06F 3/0659* (2013.01); *G06F 3/067* (2013.01); *G06F 12/0868* (2013.01)

(58) Field of Classification Search
None
See application file for complete search history.

(56) References Cited

U.S. PATENT DOCUMENTS 11,188,469 B2 * 11/2021 Wei ..................... G06F 11/1471
2019/0243553 A1 8/2019 Yamamoto et al.
2023/0083242 A1 * 3/2023 Sugihara ............... G06F 3/0613
711/154

FOREIGN PATENT DOCUMENTS

WO 2018/179073 A1 10/2018

* cited by examiner

*Primary Examiner* — Daniel D Tsui
(74) *Attorney, Agent, or Firm* — MATTINGLY & MALUR, PC

(57) ABSTRACT

When execution of a write-back operation is selected, a storage system stores, in a cache area, data for which a write request is issued from a higher-level apparatus, stores an updated content of the cache area in a cache log storage area, and then writes the data to a data storage area. On the other hand, when execution of a write-through operation is selected, the storage system does not execute storage into the cache area and the cache log storage area, stores an updated content of the data storage area in a write log storage area, and then writes the data to the data storage area.

11 Claims, 28 Drawing Sheets

WRITE PROCESSING (WRITE-THROUGH) ACCORDING TO FIRST EMBODIMENT

POWER LOSS RECOVERY PROCESSING AT TIME OF
POWER LOSS ACCORDING TO FIRST EMBODIMENT

CONFIGURATION DIAGRAM OF STORAGE SYSTEM
ACCORDING TO FIRST EMBODIMENT

EXAMPLE OF HARDWARE CONFIGURATION OF
STORAGE SYSTEM ACCORDING TO FIRST EMBODIMENT

EXAMPLE OF SOFTWARE CONFIGURATION OF
STORAGE SYSTEM ACCORDING TO FIRST EMBODIMENT

EXAMPLE OF LOGICAL CONFIGURATION OF
STORAGE SYSTEM ACCORDING TO FIRST EMBODIMENT

FIG. 8
EXAMPLE OF SOFTWARE MODULE STRUCTURE OF
STORAGE NODE ACCORDING TO FIRST EMBODIMENT
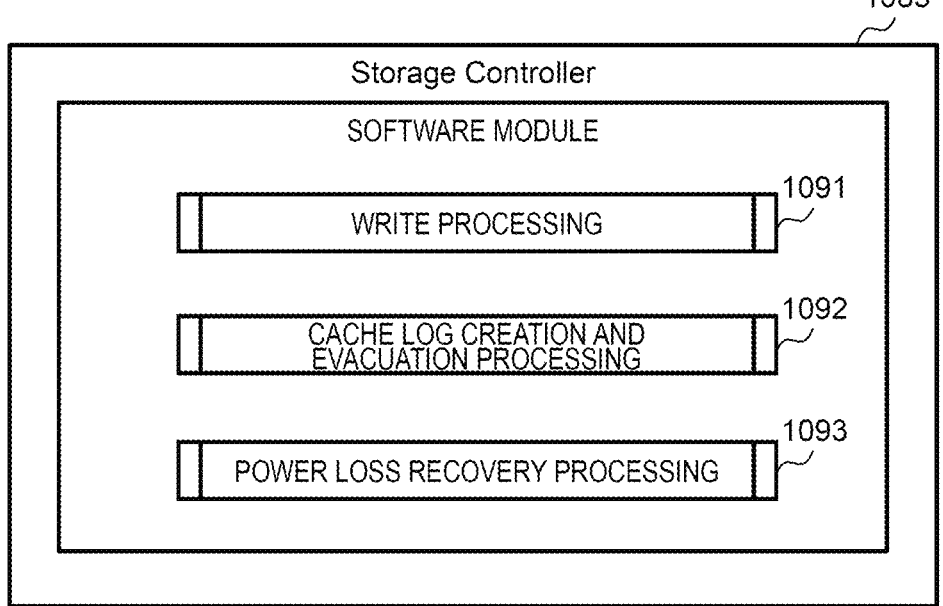
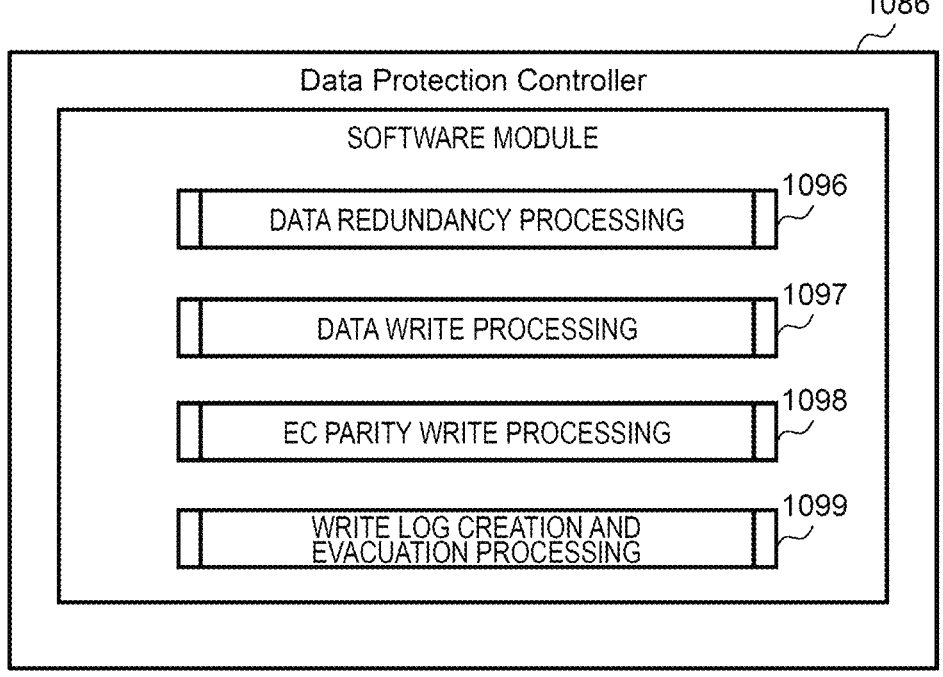

SPECIFIC EXAMPLE OF DATA STORED IN MEMORY
ACCORDING TO FIRST EMBODIMENT

FIG. 10

EXAMPLE OF CACHE LOG STORAGE AREA
MANAGEMENT TABLE ACCORDING TO FIRST EMBODIMENT

1101

| CACHE LOG AREA MANAGEMENT TABLE | | |
|---|---|---|
| DRIVE ID # | LOG START ADDRESS (LBA) | LOG END ADDRESS (LBA) |
| 1 | 0x40 0000 | 0x40 8000 |
| 2 | 0x40 0000 | 0x40 7000 |
| 3 | 0x40 0000 | 0x40 4000 |
| : | : | : |

FIG. 11

EXAMPLE OF WRITE LOG STORAGE AREA
MANAGEMENT TABLE ACCORDING TO FIRST EMBODIMENT (a) METHOD OF DIVIDING AREA AND USING EACH AREA FOR STORAGE OF
ONE WRITE LOG
1105

| WRITE LOG AREA MANAGEMENT TABLE | | |
|---|---|---|
| AREA NUMBER # | STORAGE DEVICE ID # | AREA START ADDRESS (LBA) |
| 1-1 | 1 | 0x80 0000 |
| 1-2 | 1 | 0x80 0800 |
| 1-3 | 1 | 0x80 1000 |
| 1-1 | 2 | 0x80 0000 |
| 1-2 | 2 | 0x80 0800 |
| 3-1 | 3 | 0x80 0000 |
| : | : | : |

(b) METHOD OF WRITING ONE OR MORE LOGS COLLECTIVELY BY APPEND-WRITE 1105

| WRITE LOG AREA MANAGEMENT TABLE | | | |
|---|---|---|---|
| AREA NUMBER # | STORAGE DEVICE ID # | LOG START ADDRESS (LBA) | LOG END ADDRESS (LBA) |
| 1 | 1 | 0x80 0000 | 0xA0 0000 |
| 2 | 2 | 0x80 0000 | 0x80 0000 |
| 3 | 3 | 0x80 0000 | 0x80 8000 |
| : | : | : | : |

SPECIFIC EXAMPLE OF DATA STORED IN STORAGE DEVICE
ACCORDING TO FIRST EMBODIMENT

FIG. 13

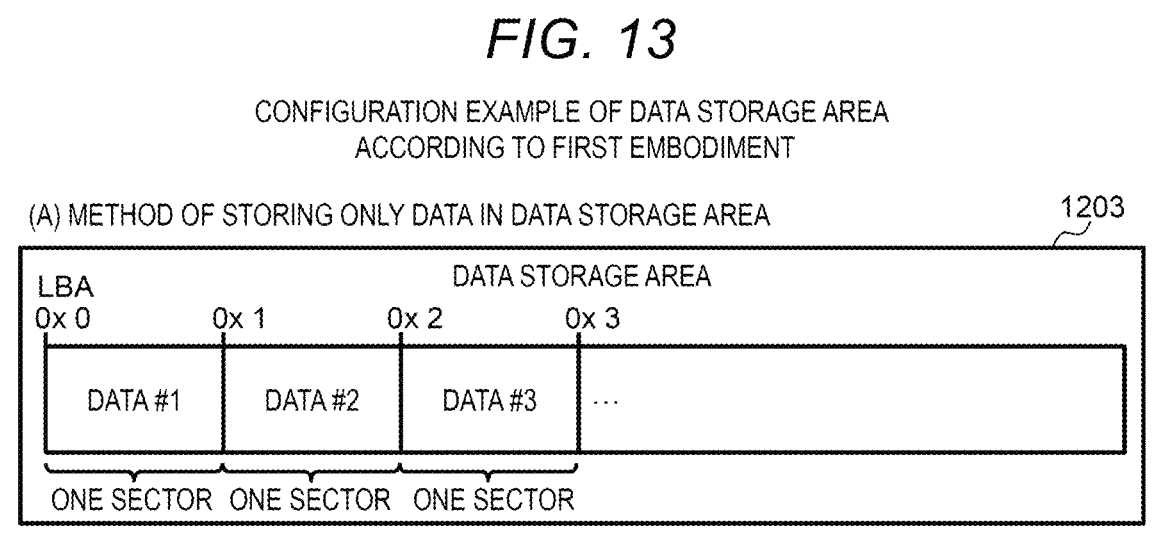

CONFIGURATION EXAMPLE OF DATA STORAGE AREA
ACCORDING TO FIRST EMBODIMENT (A) METHOD OF STORING ONLY DATA IN DATA STORAGE AREA

EXAMPLE OF STRUCTURE OF WRITE LOG HEADER
ACCORDING TO FIRST EMBODIMENT

1301

| WRITE LOG HEADER | |
|---|---|
| FIELD | VALUE |
| WRITE LOG SEQUENCE NUMBER | 210 |
| WRITE DESTINATION ADDRESS (LBA) | 0x0000 1000 |
| SIZE | 32 |

FIG. 15

EXAMPLE OF STRUCTURE OF CACHE LOG HEADER
ACCORDING TO FIRST EMBODIMENT

1401

| CACHE LOG HEADER | |
|---|---|
| FIELD | VALUE |
| LOG SEQUENCE NUMBER | 100 |
| UPDATE ADDRESS | 0x0000 1000 |
| UPDATE SIZE | 32 |

FLOWCHART SHOWING PROCESSING PROCEDURE OF
WRITE PROCESSING ACCORDING TO FIRST EMBODIMENT

FLOWCHART SHOWING PROCESSING PROCEDURE OF CACHE LOG CREATION
AND EVACUATION PROCESSING ACCORDING TO FIRST EMBODIMENT

FLOWCHART SHOWING PROCESSING PROCEDURE OF CACHE LOG
EVACUATION PROCESSING ACCORDING TO FIRST EMBODIMENT

FLOWCHART SHOWING PROCESSING PROCEDURE OF
DATA WRITE PROCESSING ACCORDING TO FIRST EMBODIMENT

FLOWCHART SHOWING PROCESSING PROCEDURE OF WRITE LOG CREATION
AND EVACUATION PROCESSING ACCORDING TO FIRST EMBODIMENT
(METHOD OF SEQUENTIALLY WRITING WRITE LOG)

FLOWCHART SHOWING PROCESSING PROCEDURE OF POWER LOSS RECOVERY
PROCESSING 1093 AT TIME OF POWER LOSS ACCORDING TO FIRST EMBODIMENT

FLOWCHART SHOWING PROCESSING PROCEDURE OF WRITE LOG CREATION
AND EVACUATION PROCESSING ACCORDING TO SECOND EMBODIMENT
(METHOD OF COLLECTIVELY WRITING WRITE LOGS)

FLOWCHART SHOWING PROCESSING PROCEDURE OF WRITE LOG CREATION
AND EVACUATION PROCESSING ACCORDING TO THIRD EMBODIMENT
(METHOD OF COLLECTIVELY WRITING CACHE LOGS)

CONFIGURATION EXAMPLE OF DATA STORAGE AREA ACCORDING TO FOURTH EMBODIMENT (B) METHOD OF STORING DATA AND PROTECTION CODE IN DATA STORAGE AREA
(B1) SAME SECTOR METHOD
•STORE DATA AND PROTECTION CODE THEREOF IN SAME SECTOR

1203

(B2) SEPARATE METHOD
•STORE PROTECTION CODES OF PLURALITY OF PIECES OF DATA COLLECTIVELY
 IN SAME SECTOR

1203

FLOWCHART SHOWING PROCESSING PROCEDURE OF
WRITE PROCESSING ACCORDING TO FOURTH EMBODIMENT
(WITH REDUNDANCY AND PROTECTION CODE)

FLOWCHART SHOWING PROCESSING PROCEDURE OF DATA
REDUNDANCY PROCESSING ACCORDING TO FOURTH EMBODIMENT

FLOWCHART SHOWING PROCESSING PROCEDURE OF DATA AND
PROTECTION CODE WRITE PROCESSING ACCORDING TO FOURTH EMBODIMENT

FLOWCHART SHOWING PROCESSING PROCEDURE OF EC PARITY
WRITE PROCESSING 1099 ACCORDING TO FOURTH EMBODIMENT

STORAGE SYSTEM AND CONTROL METHOD FOR STORAGE SYSTEM

CROSS-REFERENCE TO RELATED APPLICATION

The present application claims priority from Japanese application JP2024-068558, filed on Apr. 19, 2024, the content of which is hereby incorporated by reference into this application.

BACKGROUND OF THE INVENTION

1. Field of the Invention

The present invention relates to a storage system and a control method for a storage system.

2. Description of Related Art

In related art, a redundant configuration has been adopted in a storage system in order to improve availability and reliability.

For example, WO2018/179073 (PTL 1) discloses the following storage system. That is, the storage system includes a plurality of storage nodes each including one or more storage devices that provide a storage area and one or more storage controllers that read and write data from and to a corresponding storage device in response to a request from a host. In this storage system, storage controllers on a plurality of storage nodes are combined and managed as a redundant group. Upon receiving a request from the host, the storage controller transfers data to a plurality of storage controllers forming the same redundant group, and each storage controller stores the data in a storage device of the respective storage node.

CITATION LIST

Patent Literature

PTL 1: WO2018/179073

SUMMARY OF THE INVENTION

In a storage system in which a virtual volume that is a virtual storage area is associated with a physical area in a storage device, and data in a corresponding area on the storage device is overwritten in response to a write request to the virtual volume from a host, when power is lost while data on the storage device is overwritten, an error may occur in the data in the overwrite target area (the data may be corrupted and may not be consistent with either data before the overwrite or data after the overwrite).

According to PTL 1 described above, when data on the storage device is overwritten, the storage system writes an updated content thereof to the storage device in advance and then performs update, and therefore, even when an error occurs in the data in an overwrite target area, the error can be resolved by applying the previously written updated content.

On the other hand, in this storage system, in response to one write request received from a host, two accesses (writing of the updated content and writing of the data) to the storage device occur for data update on the storage device, and thus a time required or an amount of calculation required for processing an I/O request increases, which affects I/O performance of the host.

The invention has been made in view of the above problems, and an object thereof is to improve I/O performance for a host by reducing the number of times of drive write in response to a write request while preventing a decrease in data reliability against an error.

In order to accomplish the above object, the invention provides a storage system including: one or a plurality of storage nodes each including a non-volatile storage device, a storage controller configured to process reading and writing of data from and to the storage device, and a volatile memory, in which the memory has a cache area where data related to a write request from a higher-level apparatus is temporarily stored, the storage device has a cache log storage area where an updated content of the cache area is stored, a data storage area where the data related to the write request is permanently stored, and a write log storage area where an updated content of the data storage area is stored, the storage controller switches between a write-back operation and a write-through operation, the write-back operation being an operation in which the data related to the write request is stored in the cache area and the cache log storage area, then the higher-level apparatus is responded to, and the data is written to the data storage area after the response, and the write-through operation being an operation in which the data is written to the data storage area and then the higher-level apparatus is responded to, and in the write-back operation, writes the data to the data storage area without writing the updated content of the data storage area to the write log storage area, and in the write-through operation, writes the data to the data storage area after writing the updated content of the data storage area to the write log storage area.

According to the invention, it is possible to improve I/O performance for a host by reducing the number of times of drive write in response to a write request while preventing a decrease in data reliability against an error.

BRIEF DESCRIPTION OF THE DRAWINGS

FIG. 8 shows an example of a software module structure of a storage node according to the first embodiment.

FIG. 10 shows an example of a cache log storage area management table according to the first embodiment.

FIG. 11 shows an example of a write log storage area management table according to the first embodiment.

FIG. 13 shows a configuration example of a data storage area according to the first embodiment.

FIG. 14 shows an example of a structure of a write log header according to the first embodiment.

FIG. 15 shows an example of a structure of a cache log header according to the first embodiment.

DESCRIPTION OF EMBODIMENTS

Figure 1:
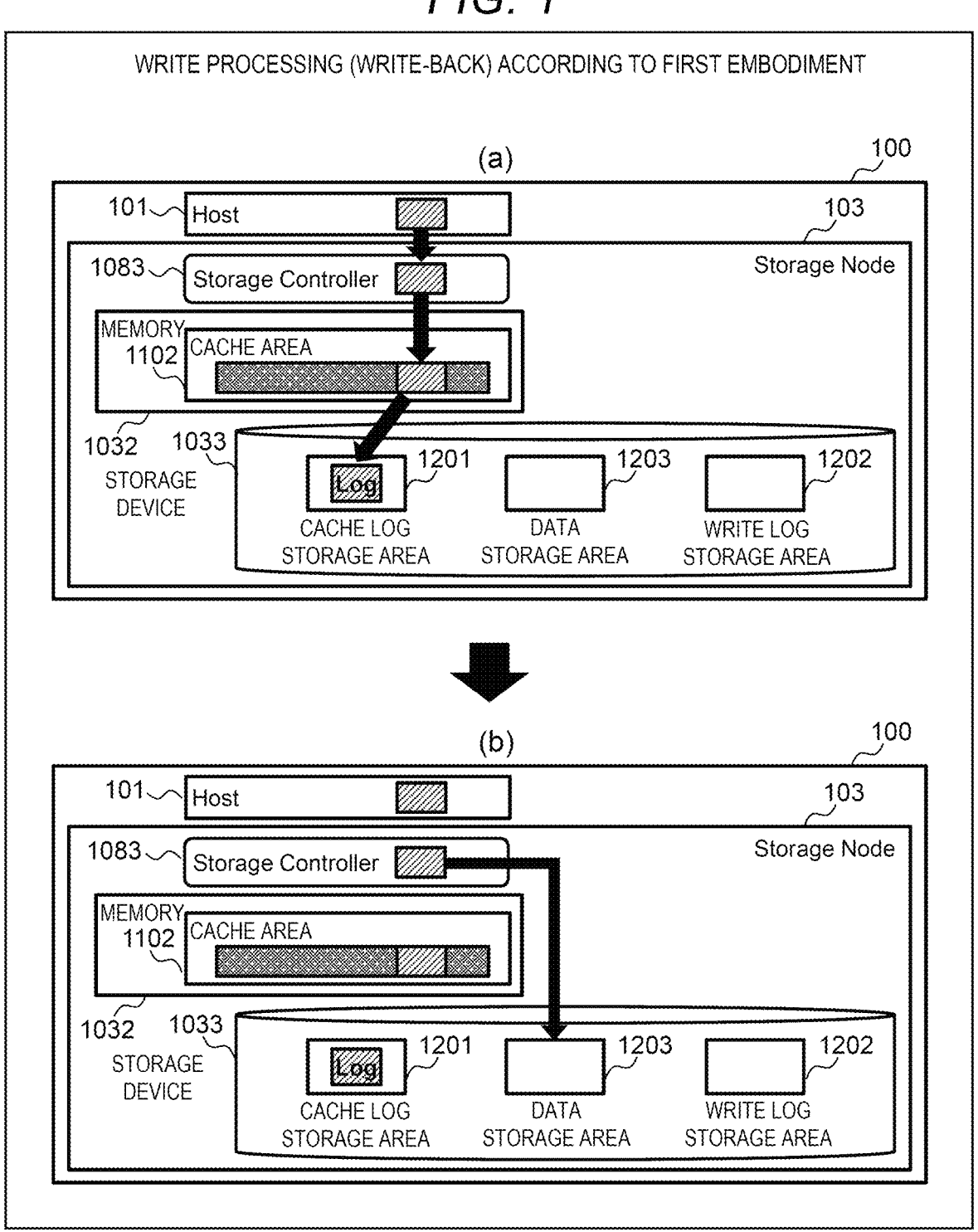
FIG. 1 shows write processing (write-back) according to a first embodiment.

Hereinafter, embodiments of the invention will be described with reference to the drawings. The embodiments relate to a storage system including a plurality of storage nodes in each of which, for example, one or more software defined storages (SDS) are implemented.

In the following description, description contents and drawings are appropriately simplified or omitted for clarity. Not all combinations of features described in the embodiments are necessarily required for solution of the invention.

In the following description, information may be described using a "table", and the information may be expressed in another data structure. In order to indicate that the information does not depend on the data structure, "XX table", "XX list", and the like may be referred to as "XX information". When describing contents of each piece of information, expressions such as "identification information", "identifier", "name", "ID", and "number" are used, and such expressions can be replaced with one another.

First Embodiment

First, an overview of a first embodiment will be described with reference to FIGS. 1 to 3.

Overview of Write Processing According to First Embodiment

Write processing according to the first embodiment will be described with reference to FIG. 1. FIG. 1 shows write processing (write-back) according to the first embodiment. FIG. 2 shows write processing (write-through) according to the first embodiment.

A storage system 100 includes a host 101 and a storage node 103. The storage node 103 is a computer apparatus that provides, to the host 101, a storage area for reading and writing data. The host 101 is an example of a higher-level apparatus, and is a computer apparatus that transmits a read request or a write request of data to the storage node 103.

The storage node 103 includes a storage controller 1083, a volatile memory 1032, and a non-volatile storage device 1033. The memory 1032 has a cache area where data received from the host is temporarily stored. The storage device 1033 has a cache log storage area 1201, a write log storage area 1202, and a data storage area 1203.

The storage controller 1083 uses the data storage area 1203 to store data for which a write request is issued from the host 101. The storage controller 1083 uses the write log storage area 1202 to store, before writing data to the data storage area, an updated content (write log) thereof.

In this way, the updated content is written in advance to the storage device 1033 as a write log. Accordingly, even when a data error occurs due to power loss or the like when data is written to the data storage area 1203, the updated content can be read from the write log storage area 1202 and applied to the data storage area again to resolve the data error.

The storage controller 1083 also uses the cache log storage area 1201 to store, when data is written to the cache area on the memory, an updated content (cache log) thereof. In this way, the updated content is written to the cache log storage area 1201. Accordingly, even when data in the cache area 1102 is lost due to power loss or the like, the data in the cache area 1102 can be recovered by reading the updated content from the cache log storage area 1201 and applying the updated content to the cache area 1102.

When the host 101 issues a write request to the storage node 103, the storage controller 1083 selects a write-through operation or a write-back operation for the data. As an example of a selection method, the write-back operation is selected when the write request is for an area that is not contiguous with an area of an immediately preceding write request (random write), and the write-through operation is selected when a data size is equal to or larger than a predetermined size or when the write request is for an area that is contiguous with the area of the immediately preceding write request (sequential write).

When the write-back operation is selected, as shown in (a) in FIG. 1, the data is written to the cache area 1102, and an updated content thereof is written to the cache log storage area 1201.

When the data is written to the data storage area 1203 on the storage device 1033, it is determined whether to write the data to the write log storage area 1202. When the write-back operation is selected, as shown in (b) in FIG. 1, since a cache updated content is written to the cache log storage area 1201, it is determined that no write log is to be written, and the data is written only to the data storage area 1203.

Figure 2:
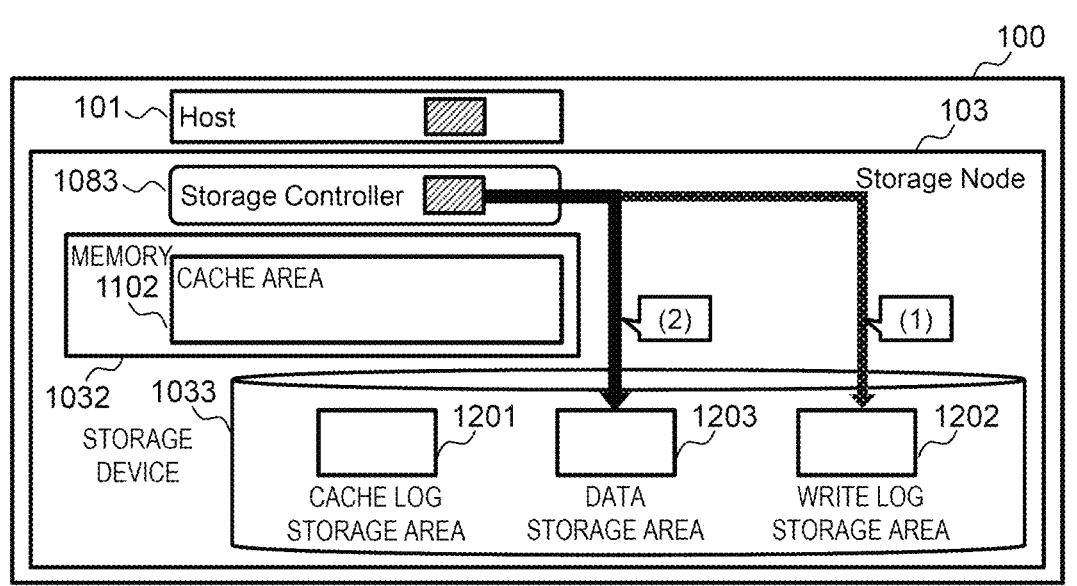
FIG. 2 shows write processing (write-through) according to the first embodiment.

On the other hand, when the write-through operation is selected, as shown in FIG. 2, the data is written to the cache area 1102 as temporary storage (not shown), and no data is written to the cache log storage area 1201. Then, (1): since the write-through operation is selected, it is determined that a write log is to be written, the write log is created and written to the write log storage area 1202, and then (2) the data stored in the cache area 1102 is written to the data storage area 1203.

According to this method, the data written to the data storage area 1203 is written to the cache log storage area 1201 or the write log storage area 1022 as information on an updated content. Thus, even when a data error occurs in the data storage area 1203 due to power loss or the like during writing to the data storage area 1203, the data in the cache log storage area 1201 or the write log storage area 1022 can be written to the data storage area 1203, and the error can be resolved.

Figure 3:
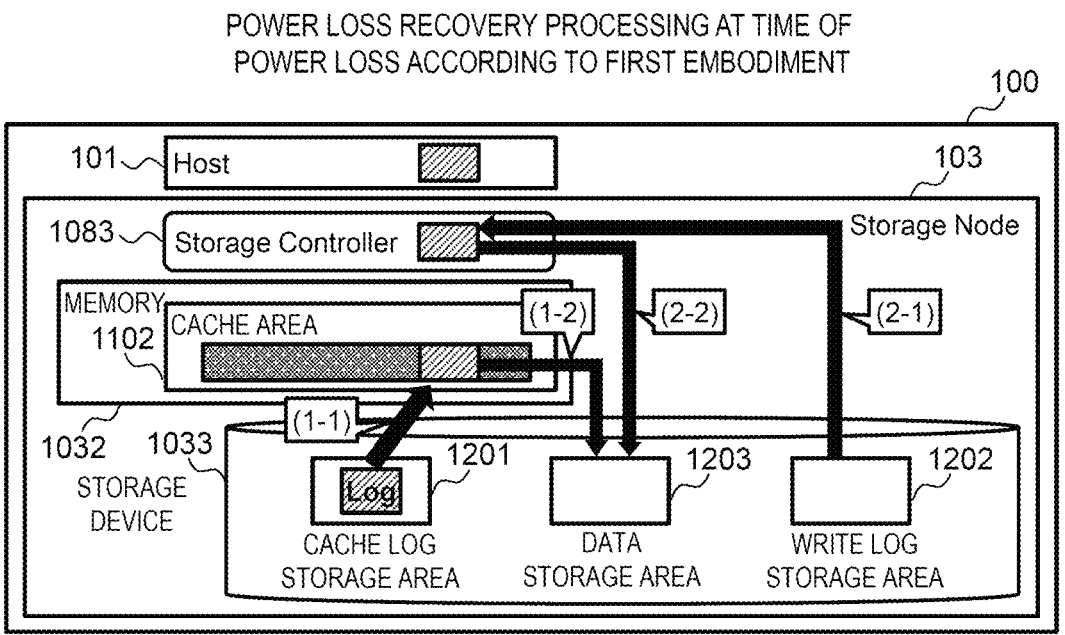
FIG. 3 shows power loss recovery processing at the time of power loss according to the first embodiment.

Overview of Power Loss Recovery Processing at Time of Power Loss According to First Embodiment FIG. 3 shows power loss recovery processing at the time of power loss according to the first embodiment. In the power loss recovery processing when power is lost, first, (1-1) a cache updated content stored in the cache log storage area 1201 is read and applied to the cache area 1102. Then, (1-2) recovered data in the cache area 1102 is written to the data storage area 1203. The cache updated content stored in the cache log storage area 1201 is data related to the write processing of the write-back operation.

Next, (2-1) the updated content of the data storage area 1203 is read from the write log storage area 1202, and (2-2) the read updated content is applied to the data storage area 1203. A write log stored in the write log storage area 1202 is data related to the write processing of write-through.

Configuration of Storage System 100 According to First Embodiment

Figure 4:
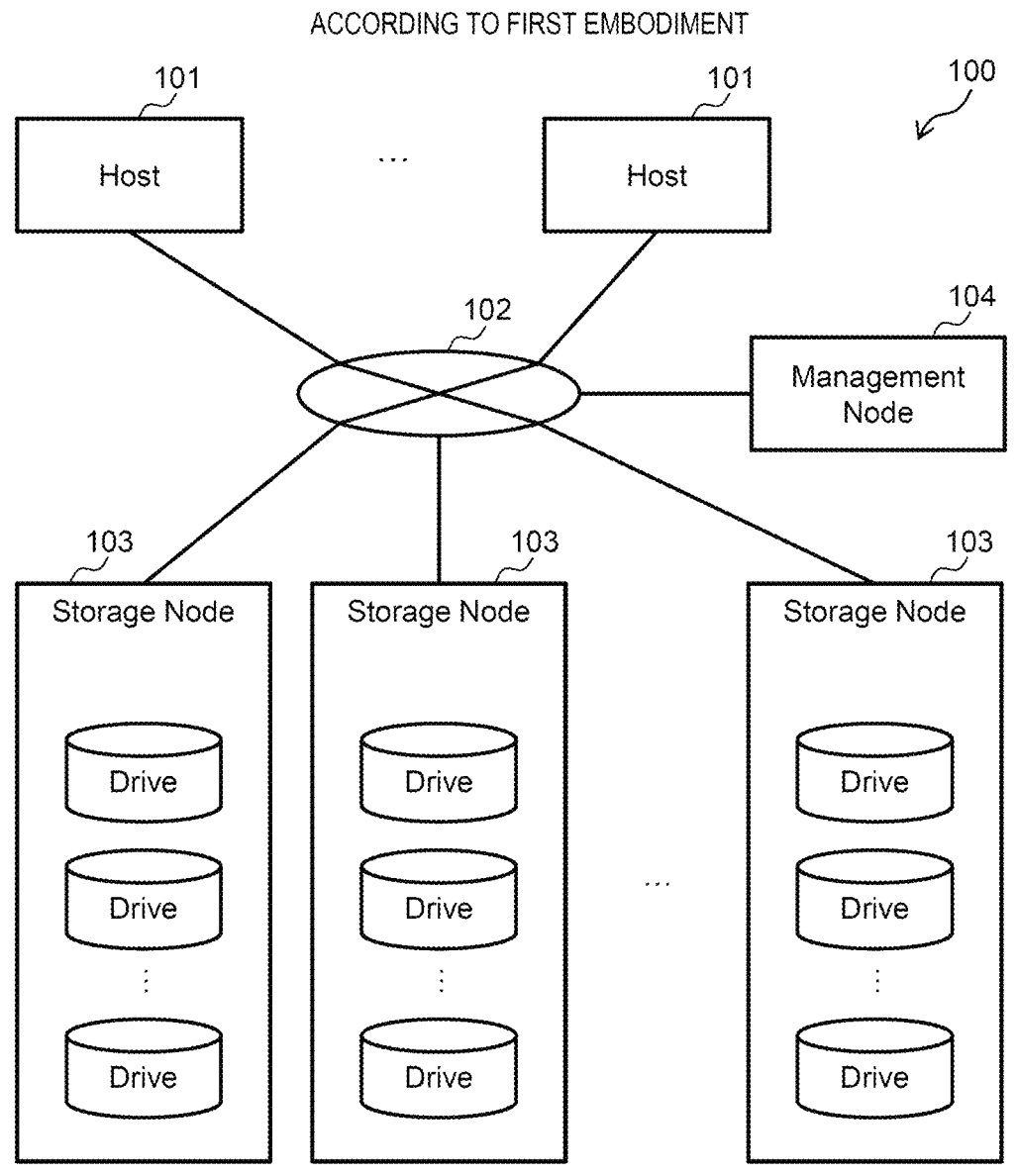
FIG. 4 is a configuration diagram of a storage system according to the first embodiment.

FIG. 4 is a configuration diagram of the storage system 100 according to the first embodiment.

The storage system 100 includes, for example, a plurality of hosts 101, a plurality of storage nodes 103, and a management node 104. The hosts 101 and the storage nodes 103 are connected via a network 102 implemented by Ethernet, a local area network (LAN), Fibre Channel, or the like.

Each host 101 is a general-purpose computer apparatus that transmits a read request or a write request to each storage node 103 in response to a user operation or a request from an application program or the like operating on the host 101. Hereinafter, the read request and the write request are collectively referred to as an input/output (I/O) request. The host 101 may be a virtual computer apparatus such as a virtual machine.

The storage node 103 is a computer apparatus that provides, to the host 101, a storage area for reading and writing data. The storage node 103 is, for example, a general-purpose computer apparatus.

The management node 104 is a computer apparatus used by a system administrator to manage the entire storage system 100. The management node 104 manages a plurality of storage nodes 103 as a group called a cluster. FIG. 1 shows an example in which only one cluster is provided, and a plurality of clusters may be provided in the storage system 100.

In this way, the storage system 100 includes one or more storage nodes 103, one or more hosts 101, and one management node 104. The configuration in the drawing is an example, and the host 101, the storage node 103, and the management node 104 may be the same node. Such nodes may be implemented by a virtual machine or a container, or may coexist as processes on one computer apparatus. The network may be made redundant or may be separated into a management network and a storage network.

Hardware Configuration of Storage System 100 According to First Embodiment

Figure 5:
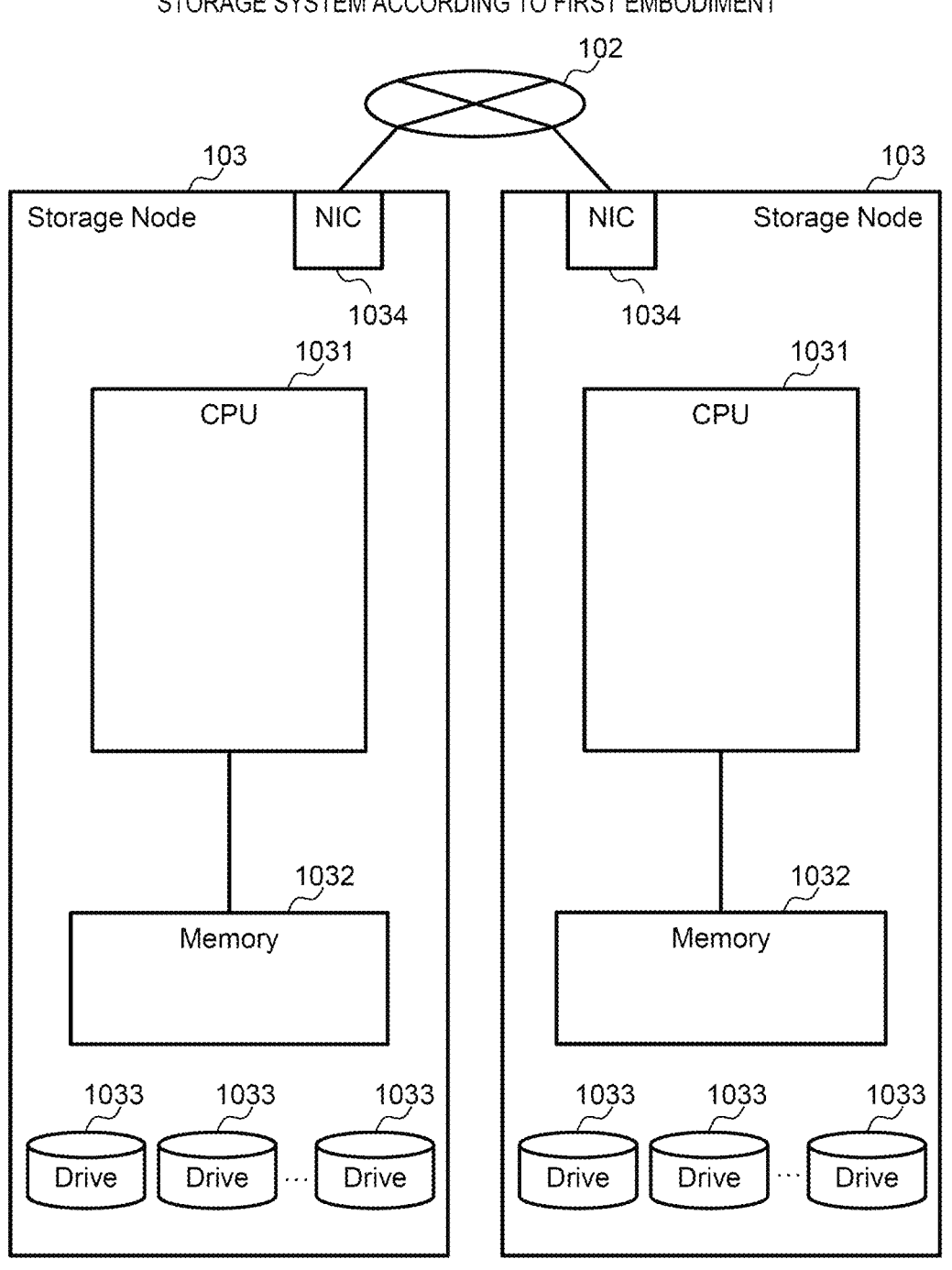
FIG. 5 shows an example of a hardware structure of the storage system according to the first embodiment.

FIG. 5 shows an example of a hardware structure of the storage system 100 according to the first embodiment.

The storage node 103 includes a central processing unit (CPU) 1031, a memory 1032, a plurality of storage devices 1033 (drives), and a communication apparatus 1034.

The CPU 1031 controls processing of the entire storage node. The memory 1032 is implemented by a semiconductor memory such as a static random access memory (static RAM (SRAM)) or a dynamic RAM (DRAM). The memory 1032 is used to temporarily retain various programs and necessary data. The CPU 1031 executes a program stored in the volatile memory 1032 and thus executes various types of processing of the storage node 103 as a whole to be described later.

The storage device 1033 includes one or a plurality of types of large-capacity non-volatile storage apparatuses such as a solid state drive (SSD) and a hard disk drive. The storage device 1033 provides a physical storage area for reading or writing data in response to an I/O request from the host 101.

The communication apparatus 1034 is an interface for the storage node 103 to communicate with the host 101, another storage node 103, or the management node 104 via the network 102, and the communication apparatus 1034 is implemented by, for example, a network interface card (NIC) or an FC card. The communication apparatus 1034 performs protocol control during communication with the host 101, the other storage node 103, or the management node 104.

Software Configuration of Storage System 100 According to First Embodiment

Figure 6:
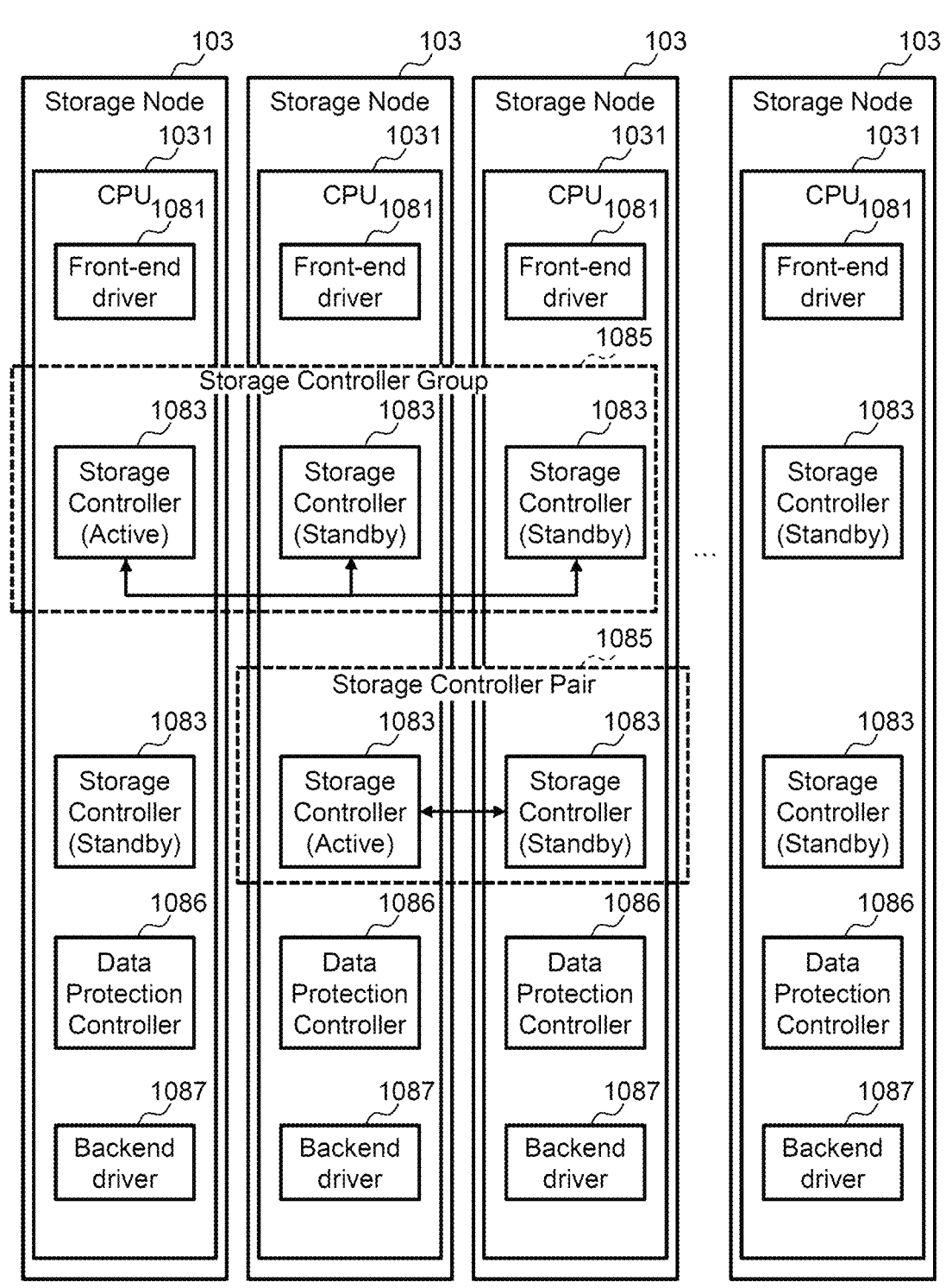
FIG. 6 shows an example of a software configuration of the storage system according to the first embodiment.

FIG. 6 shows an example of a software configuration of the storage system 100 according to the first embodiment.

The storage node 103 includes a front-end driver 1081, a back-end driver 1087, one or a plurality of storage controllers 1083, and a data protection controller 1086.

The front-end driver 1081 is software having a function of controlling the communication apparatus 1034 and providing the CPU 1031 with an interface for communication between the storage controller 1083 and the host 101, the other storage node 103, and the management node 104.

The back-end driver 1087 is software having a function of controlling each storage device 1033 in its own storage node 103 and providing the CPU 1031 with an abstracted interface at the time of communicating with each storage device 1033.

The storage controller 1083 is software that functions as an SDS controller. The storage controller 1083 receives an I/O request from the host 101 and issues an I/O command corresponding to the I/O request to the data protection controller 1086. The storage controller 1083 has a logical volume configuration function. The logical volume configuration function associates a logical chunk configured by the data protection controller 1086 with a logical volume provided to a host. For example, a straight mapping (a logical chunk and a logical volume are associated 1:1, and an address of the logical chunk and an address of the logical volume are the same) method may be used. Alternatively, a virtual volume function (thin provisioning) method (a method in which a logical volume and a logical chunk are divided into small size areas (pages) and addresses of the logical volume and the logical chunk are associated with each other in units of pages) may be used.

In the case of this embodiment, each storage controller 1083 implemented in the storage node 103 is managed as a storage controller group 1085 that constitutes a redundant configuration together with another storage controller 1083 provided in another storage node 103. Two storage nodes 103 belonging to the storage controller group 1085 may also be referred to as a storage controller pair.

The storage controller group 1085 is set in a state in which one storage controller 1083 can receive the I/O request from the host 101 (an active state, hereinafter referred to as an active mode). In the storage controller group 1085, the other storage controller 1083 is set in a state of not receiving the I/O request from the host 101 (a standby state, hereinafter referred to as a standby mode). A node where the storage controller 1083 in the active mode operates is referred to as an active node, and a node where the storage controller 1083 in the standby mode operates is referred to as a standby node.

In the storage controller group 1085, when power loss occurs in the active storage controller or the storage node 103 where the controller is provided, the state of the standby storage controller is switched to the active mode. The storage controller 1083 set in the active mode is referred to as an active storage controller. The storage controller 1083 set in the standby mode is referred to as a standby storage controller. Accordingly, when the active storage controller cannot operate, the standby storage controller can take over I/O processing executed by the active storage controller.

The data protection controller 1086 is software having a function of allocating, as a logical chunk, a physical storage area provided to each storage controller group 1085 by the storage device 1033 in its own storage node 103 or another storage node 103. Further, the data protection controller 1086 is software having a function of reading or writing specified data from or to the corresponding storage device 1033 according to the above-described I/O command issued from the storage controller 1083.

There are two methods for allocating the physical storage area of the data protection controller 1086, and both methods are applicable to the storage system 100. A first method is a method of allocating a physical area of one storage device to one logical chunk. That is, to each storage controller group 1085, a physical area of one storage device 1033 in its own storage node 103 or another storage node 103 is allocated. A second method is a method of allocating physical areas of storage devices 1033 in two or more storage nodes 103 to one logical chunk in order to make data redundant among a plurality of storage nodes 103.

When a physical storage area provided by the storage device 1033 in another storage node 103 is allocated to the storage controller group 1085, the data protection controller 1086 executes the following processing. That is, the data protection controller 1086 cooperates with another data protection controller 1086 implemented in the other storage node 103 to exchange data with the other data protection controller 1086 via the network 102. Accordingly, the data protection controller 1086 reads or writes data related to the I/O command from or to the storage area in the other storage node 103 according to the I/O command from the active storage controller of the storage controller group 1085.

When the data protection controller 1086 adopts the redundant method as the physical storage area allocation configuration, methods for storing data in two or more corresponding storage devices 1033 include a mirroring method and an erasure coding (EC) method. Any method is applicable to the storage system 100.

In the mirroring method, the data protection controller 1086 writes data provided from the active storage controller of the storage controller group 1085 to storage devices 1033 on corresponding two or more storage nodes 103 for redundancy. In the EC method, the data protection controller 1086 divides data provided from the active storage controller of the storage controller group 1085 into first data and second data. The first data is stored in a first storage node 103, the second data is stored in a second storage node 103, and parity calculated from the first data and the second data is stored in the storage device 1033 of a third storage node 103.

Logical Configuration of Storage System 100 According to First Embodiment

Figure 7:
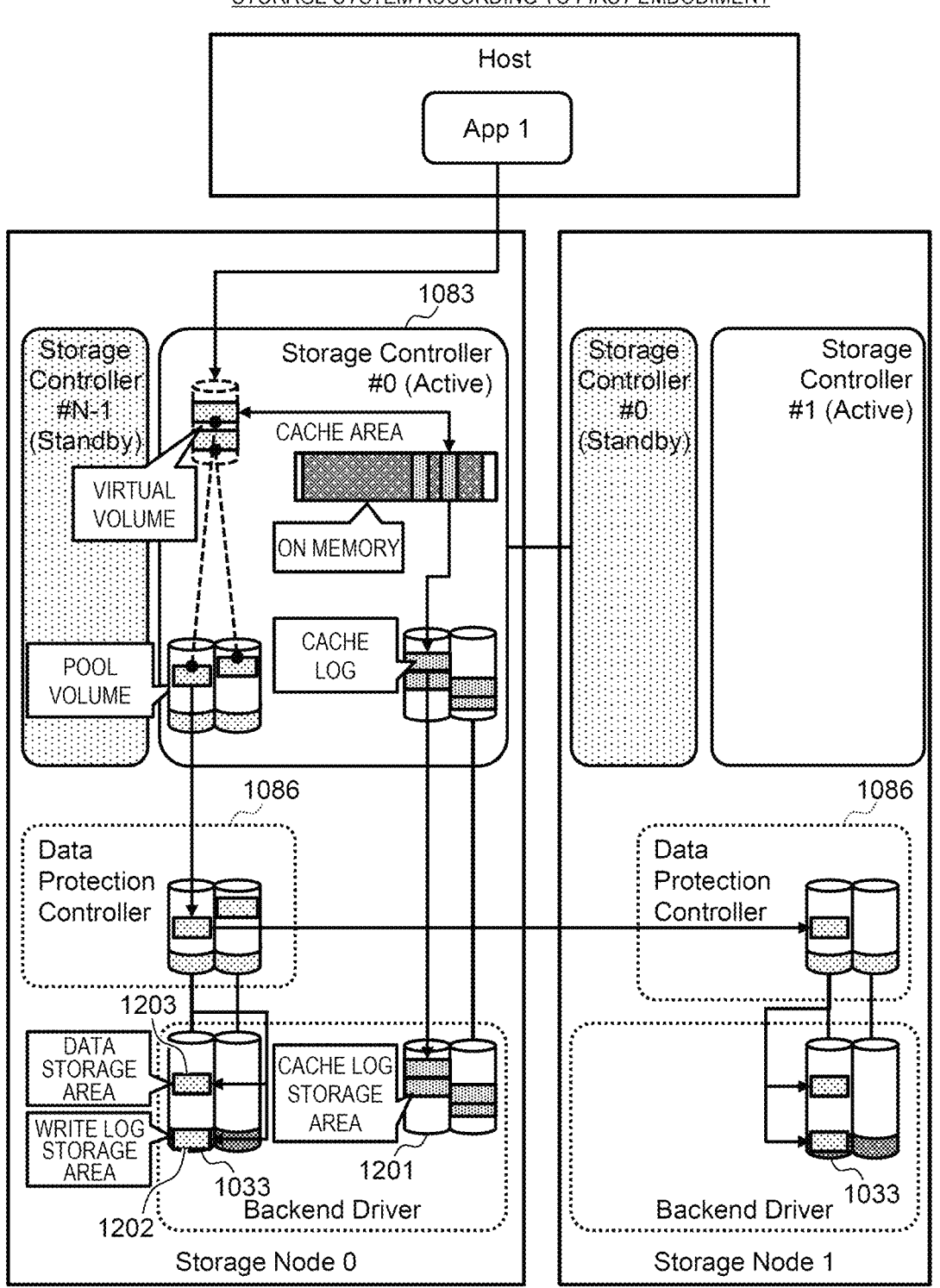
FIG. 7 shows an example of a logical configuration of the storage system according to the first embodiment.

FIG. 7 shows an example of a logical configuration of the storage system 100 according to the first embodiment.

The storage controller 1083 uses a storage area (pool volume) provided by the data protection controller 1086 to provide a virtual storage area (virtual volume) to a host (thin provisioning method). The storage controller 1083 reserves a cache area on a memory and uses a storage area provided by a back-end driver as the cache log storage area 1201.

The data protection controller 1086 uses storage areas provided by the back-end driver as the data storage area 1203 and the write log storage area 1202. The data protection controller 1086 creates storage areas (pool volumes) associated with data storage areas 1203 in two or more storage nodes 103 by the so-called mirroring method, and provides such storage areas to the storage controller 1083.

When a write request for a virtual storage area is received from the host 101, the storage controller 1083 selects the write-through operation or the write-back operation for data related to the write request. When the write-back operation is selected, the storage controller 1083 writes the data to the cache area, converts an updated content into a log (cache log), and writes the log to the cache log storage area 1201 to make the log non-volatile. After the cache log is written or when the write-through operation is selected, the storage controller 1083 sends an I/O request to the data protection controller 1086.

Upon receiving the I/O request from the active storage controller, the data protection controller 1086 sends the I/O request to the data protection controller 1086 of another storage node 103 including the storage device 1033 that is a redundant write destination of the data. Here, the data protection controller 1086 that is a transmission source of the I/O request may be referred to as a "source data protection controller", and the data protection controller 1086 that is a transmission destination may be referred to as a "destination data protection controller".

Next, the source data protection controller and the destination data protection controller determine whether to write a write log to the storage device 1033. The source data protection controller and the destination data protection controller determine to write the write log when the write-through operation is selected in the storage controller 1083. Then, the source data protection controller and the destination data protection controller each convert the data into a log (write log) and write the log to the write log storage area 1202 on the storage device on the respective storage node 103 where each of the source data protection controller and the destination data protection controller is implemented. After writing the write log, the source data protection controller and the destination data protection controller write the data to the data storage area 1203.

On the other hand, when the write-back operation is selected in the storage controller 1083, the source data protection controller and the destination data protection controller determine not to write the write log, and directly write the data to the data storage area 1203.

Software Module Structure of Storage Node 103 According to First Embodiment

FIG. 8 shows an example of a software module structure of the storage node 103 according to the first embodiment. The storage controller 1083 executes write processing 1091, cache log creation and evacuation processing 1092, and power loss recovery processing 1093. The data protection controller 1086 executes data redundancy processing 1096, data write processing 1097, EC parity write processing 1098, and write log creation and evacuation processing 1099. Each piece of processing will be described in detail later. The data redundancy processing 1096 and the EC parity write processing 1098 are processing according to a fourth embodiment to be described later, and may be omitted in embodiments other than the fourth embodiment.

Data Stored in Memory 1032 According to First Embodiment

Figure 9:
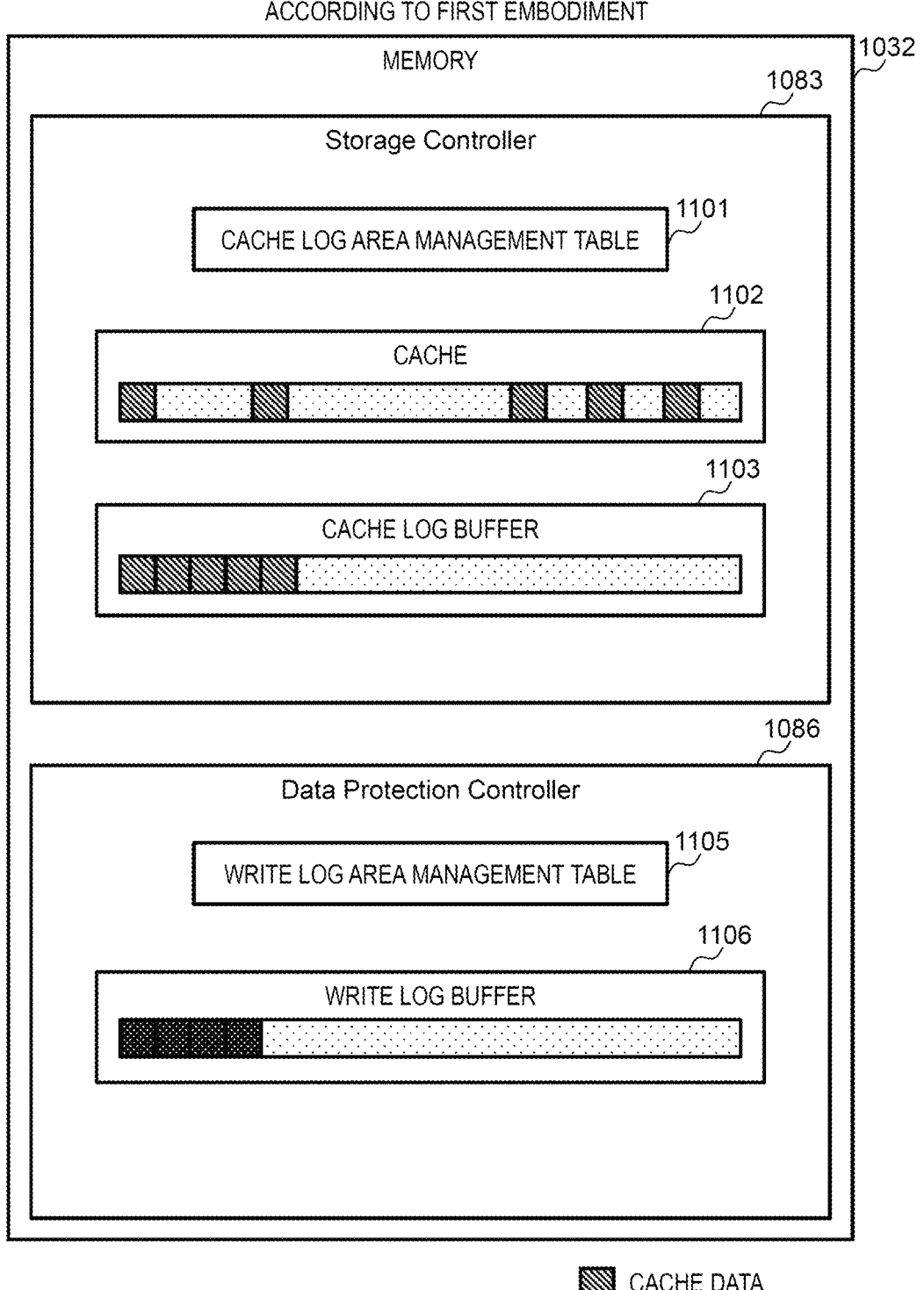
FIG. 9 shows a specific example of data stored in a memory according to the first embodiment.

FIG. 9 shows a specific example of data stored in the memory 1032 according to the first embodiment. A cache log storage area management table 1101, the cache area 1102, and a cache log buffer 1103 are provided in an area of the memory 1032 managed by the storage controller 1083 provided in the CPU 1031 of the storage node 103. A write log storage area management table 1105 and a write log buffer 1106 are provided in an area of the memory 1032 managed by the data protection controller 1086.

Cache Log Storage Area Management Table 1101 According to First Embodiment

FIG. 10 shows an example of the cache log storage area management table 1101 according to the first embodiment. An example will be described in which a method of writing one or more cache logs collectively to the cache log storage area on the storage device 1033 by append-write is used as a cache log storage method.

The cache log storage area management table 1101 when this method is adopted includes items of a cache log storage area ID, an ID of the storage device 1033, a start position address of a stored log (a storage position of a first log), and an end position address (an end position of a last log). The "cache log storage area ID" uniquely identifies a storage area of a cache log. The "ID of the storage device 1033" uniquely identifies the storage device 1033 where the cache log storage area identified by the cache log storage area ID is provided. The "start position address" is a start position address of a log stored in the cache log storage area identified by the cache log storage area ID. The "end position address" is an end position address of the log stored in the cache log storage area identified by the cache log storage area ID.

Write Log Storage Area Management Table 1105 According to First Embodiment

FIG. 11 shows an example of the write log storage area management table 1105 according to the first embodiment. A write log can be stored by a method of dividing the inside of the write log storage area on the storage device 1033 into a plurality of areas and storing one write log in each of the divided areas (see (a) in FIG. 11). The write log storage area management table when this method is adopted includes, for each of the divided areas, items of a write log storage area ID for uniquely identifying the area, an ID of the storage device 1033 where the write log storage area is provided, and a start address of the area.

As another log writing method, a method of collectively writing one or more write logs to the write log storage area on the storage device 1033 by append-write can be used for storing the write log (see (b) in FIG. 11). The write log storage area management table when this method is adopted includes items of a write log storage area ID, an ID of the storage device 1033, a start position address (a storage position of a first log), and an end position address (an end position of a last log). The "write log storage area ID" uniquely identifies a write log storage area. The "ID of the storage device 1033" uniquely identifies the storage device 1033 where the write log storage area identified by the write log storage area ID is provided. The "start position address" is a start position address of a write log stored in the write log storage area identified by the write log storage area ID. The "end position address" is an end position address of the write log stored in the write log storage area identified by the write log storage area ID.

Data Stored in Storage Device 1033 According to First Embodiment

Figure 12:
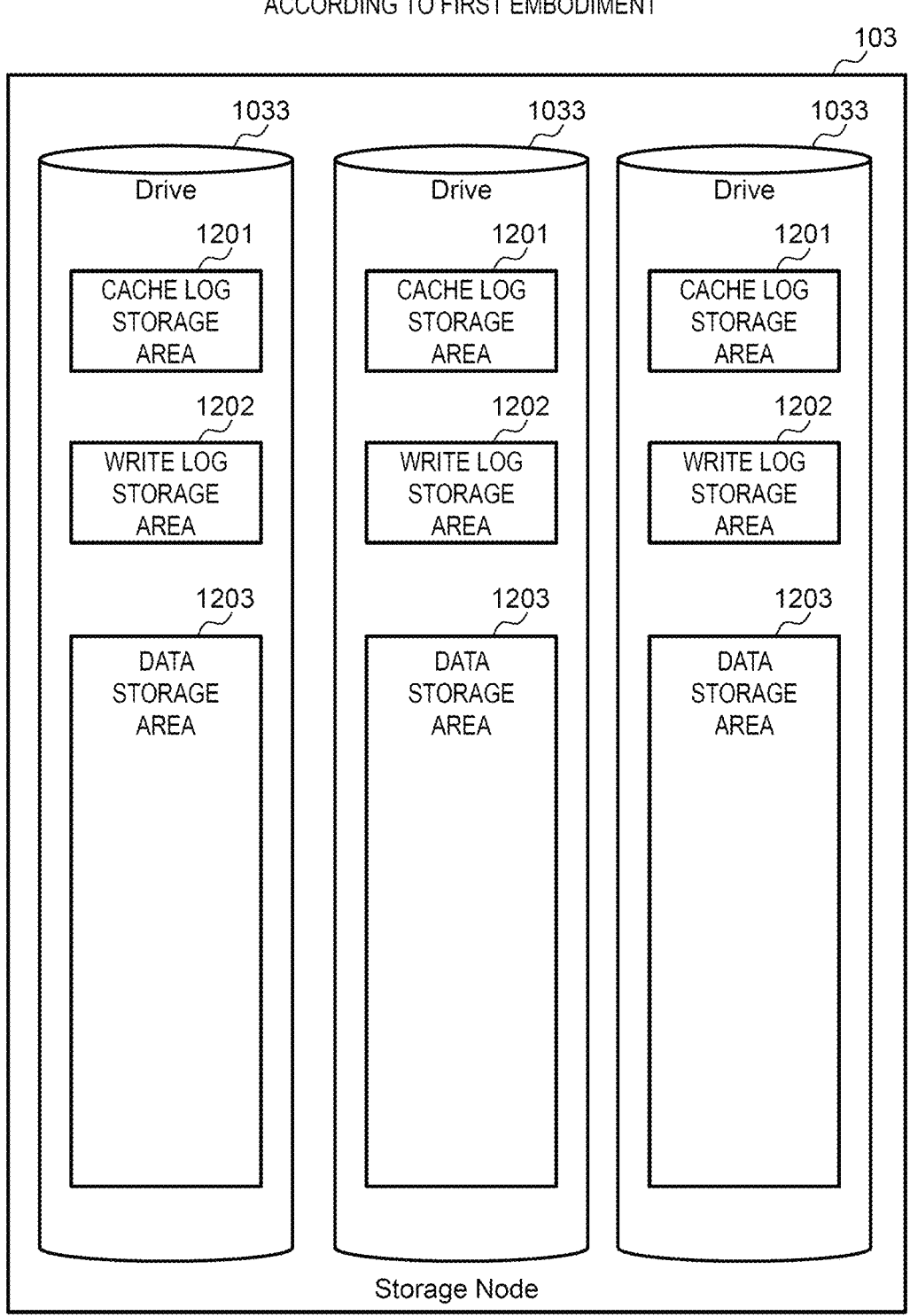
FIG. 12 shows a specific example of data stored in a storage device according to the first embodiment.

FIG. 12 shows a specific example of data stored in the storage device 1033 according to the first embodiment. The cache log storage area 1201, the write log storage area 1202, and the data storage area 1203 are provided on each storage device 1033. The cache log storage area 1201 is an area where a cache log is stored and a log write destination address is managed by the cache log storage area management table 1101. The write log storage area 1202 is an area where a write log is stored and a log write destination address is managed by the write log storage area management table 1105. Details of the data storage area 1203 will be described later with reference to FIG. 13.

Configuration of Data Storage Area 1203 According to First Embodiment

FIG. 13 shows a configuration example of the data storage area 1203 according to the first embodiment.

The data storage area 1203 is used as a physical storage area where data received from the host 101 is stored. A method may be adopted in which the inside of the data storage area 1203 is divided into a plurality of areas, and the divided areas are allocated to logical chunks. A protection code is a parity code, a checksum, a cyclic redundancy code, or the like calculated from data.

As shown in "(A) Method of Storing Only Data in Data Storage Area" in FIG. 13, the inside of the data storage area 1203 is divided in units of sectors, which are management units of the storage area. Each sector is an example of a minimum write unit of data. The divided areas are provided to the data protection controller 1086 as physical storage areas. The data protection controller 1086 allocates the provided physical storage areas to logical chunks, and writes, when an I/O request is received from the storage controller 1083, data to an area on the corresponding storage device 1033.

Write Log Header 1301 According to First Embodiment

FIG. 14 shows an example of a structure of a write log header 1301 according to the first embodiment.

The write log header 1301 is a table in a write log written by the data protection controller 1086 to the storage device 1033. The write log header 1301 is added, when the write log is created, at the beginning of the log by the data protection controller 1086.

The write log header 1301 includes fields of a write log sequence number, a write destination address, a size, and the like. The field of the write log sequence number stores a write log sequence number uniquely assigned to each write log. The field of the write destination address stores an address of a target data storage area where each log is to be updated. The field of the update size stores a size to be updated.

Cache Log Header 1401 According to First Embodiment

FIG. 15 shows an example of a structure of a cache log header 1401 according to the first embodiment.

The cache log header 1401 is a table in each cache log stored in the cache log storage area on the storage device 1033. The cache log header 1401 is added, when the data protection controller 1086 creates a cache log from an updated content at the time of cache update, to the beginning of the cache log.

The cache log header 1401 includes fields of a log sequence number, an update address, an update size, and the like. The field of the log sequence number stores a log sequence number uniquely assigned to each cache log. The field of the update address stores an address of target cache data to be updated in each log. The field of the update size stores a size to be updated.

Write Processing 1091 According to First Embodiment

Figure 16:
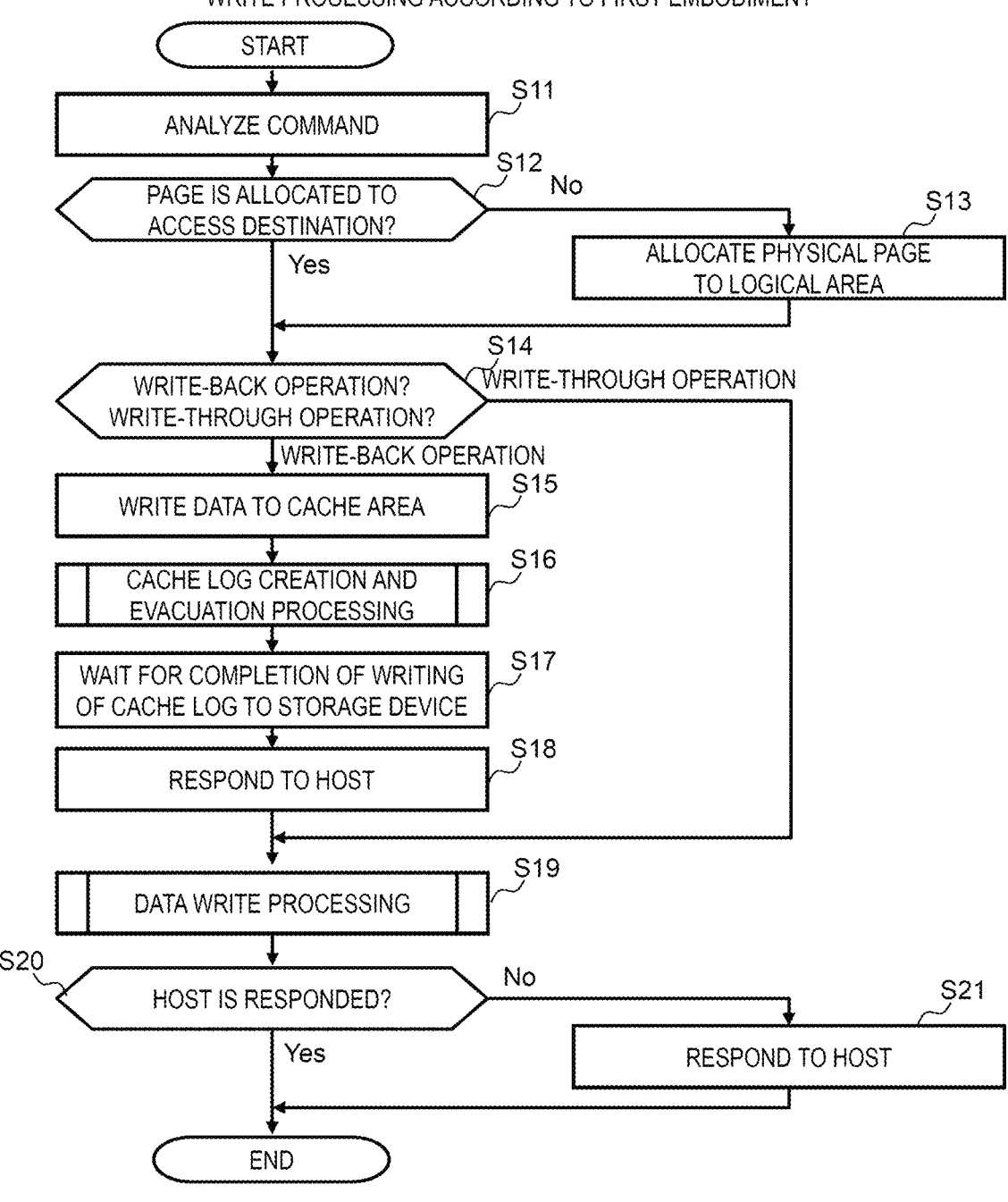
FIG. 16 is a flowchart showing a processing procedure of the write processing according to the first embodiment.

FIG. 16 is a flowchart showing a processing procedure of the write processing 1091 according to the first embodiment. FIG. 16 shows an example of processing performed when a write request is issued from the host 101 to the virtual volume provided by the storage controller 1083. The write processing 1091 is executed by the active controller in the pair of storage controllers 1083.

First, the storage controller 1083 analyzes a command (step S11), and determines whether any page is allocated to an access destination (step S12). When page allocation is not completed (step S12; No), the storage controller 1083 allocates a physical page on the storage device 1033 to a logical area (step S13).

After the physical page allocation or when the page allocation to the access destination is completed (step S12; Yes), the storage controller 1083 selects whether to perform the write-back operation or the write-through operation for data (step S14). In this selection, as an example, the write-back operation is selected when an area on the virtual volume that is a write request destination is not contiguous with immediately preceding write request data (random write). When a data size of the write request is equal to or larger than a predetermined size, or when the area on the virtual volume of current write request data is contiguous with the immediately preceding write request data (sequential write), the write-through operation is selected.

When the write-back operation is selected (step S14; write-back operation), the storage controller 1083 writes the target data to be written to the cache area 1102 on the memory 1032 (step S15). Subsequently, the storage controller 1083 executes the cache log creation and evacuation processing 1092 to write a cache updated content to the storage device 1033 (step S16), and waits for completion thereof (step S17). Details of the cache log creation and evacuation processing 1092 in step S16 will be described later with reference to FIG. 17.

Subsequently, after completion of writing of the cache updated content to the storage device 1033, the storage controller 1083 returns a write request response to the host 101 (step S18).

Subsequently, the data protection controller 1086 executes data write processing after the storage controller 1083 responds to the host 101 or when the write-through operation is determined (step S14; write-through operation). That is, the data protection controller 1086 writes data to the storage device 1033 (step S19). Details of the data write processing will be described later with reference to FIG. 19.

Subsequently, the storage controller 1083 determines whether a host response is completed after writing to the data storage area (step S20). When the host response is not completed (step S20; No), the storage controller 1083 responds to the host 101 (step S21). After the storage device host response or when the host response is completed (step S20; Yes), the storage controller 1083 ends the write processing 1091.

Figure 17:
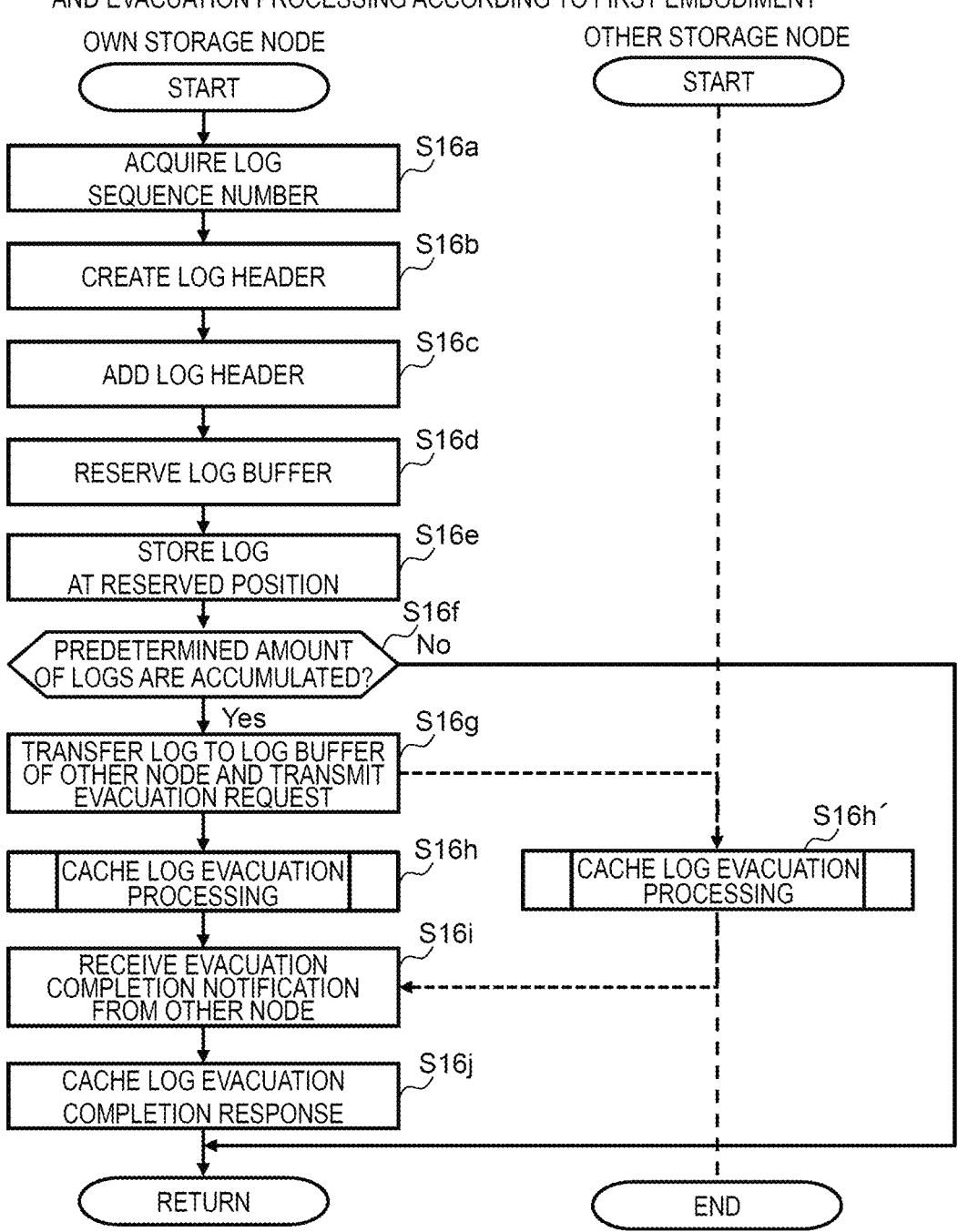
FIG. 17 is a flowchart showing a processing procedure of cache log creation and evacuation processing according to the first embodiment.

Cache Log Creation and Evacuation Processing 1092 According to First Embodiment FIG. 17 is a flowchart showing a processing procedure of the cache log creation and evacuation processing 1092 according to the first embodiment. In cache log creation processing, the storage controller 1083 creates a cache log by adding a cache log header 1041 to a cache updated content. Then, the storage controller 1083 collectively writes one or more created cache logs to storage devices 1033 in its own storage node and another storage node forming a pair with its own storage node.

Specifically, the storage controller 1083 acquires a log sequence number uniquely set in the cache log (step S16*a*), and creates the cache log header 1041 (step S16*b*). Subsequently, the storage controller 1083 adds the cache log header 1041 to data received from a processing caller (step S16*c*). Subsequently, the storage controller 1083 reserves a storage area on the cache log buffer 1103 (step S16*d*) and stores the log in the reserved area (step S16*e*).

Next, the storage controller 1083 verifies whether a total size of the cache log on the cache log buffer 1103 is equal to or larger than a predetermined size (step S16*f*). When the total size of the cache log is equal to or larger than the predetermined size (step S16*f*; Yes), the storage controller 1083 transfers the log to the cache log buffer 1103 of another storage e node 103. Then, the storage controller 1083 transmits a cache log evacuation request (step S16*g*). Then, the storage controller 1083 executes cache log evacuation processing of its own storage node 103 (step S16*h*). The other storage node 103 that receives the transferred log executes log evacuation processing of its own storage node 103 in the same manner as in step S16*h* (step S16*h*'). Details of the cache log evacuation processing in steps S16*h* and S16*h*' will be described later with reference to FIG. 18.

The storage controller 1083 of the node that transmits the evacuation request receives an evacuation completion notification from the other node (step S16*i*), returns a completion response (step S16*j*), and ends the processing.

Cache Log Evacuation Processing According to First Embodiment

Figure 18:
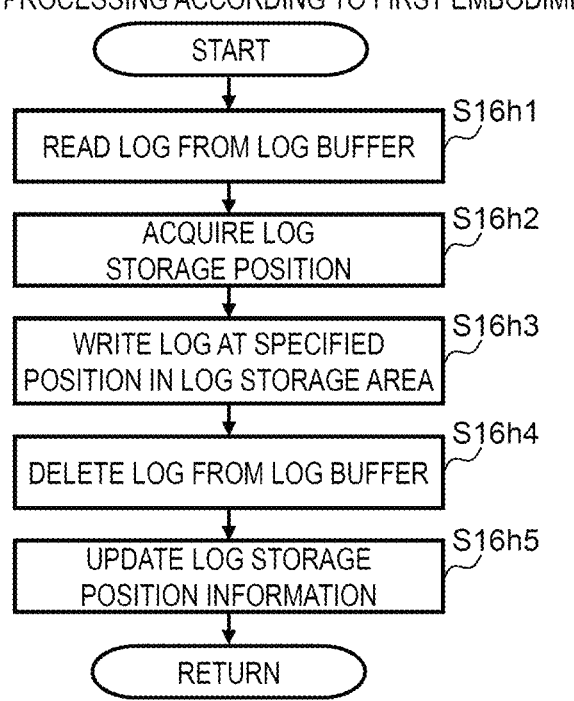
FIG. 18 is a flowchart showing a processing procedure of cache log evacuation processing according to the first embodiment.

FIG. 18 is a flowchart showing a processing procedure of the cache log evacuation processing according to the first embodiment.

First, the storage controller 1083 reads the log from the cache log buffer 1103 (step S16*h*1). Next, the storage controller 1083 selects, from the cache log storage area management table 1101, one cache log storage area as a write destination, acquires a log end address thereof, and sets the log end address as a storage destination address (step S16*h*2). Then, the storage controller 1083 writes the cache log to the acquired storage destination address (step S16*h*3). Subsequently, the storage controller 1083 deletes, from the log buffer, a log written to the storage device (step S16*h*4). Then, the storage controller 1083 updates the log end address of the cache log storage area retained by the cache log storage area management table 1101 to an address indicating an end position of the log written to the area (step S16*h*5).

Data Write Processing 1097 According to First Embodiment

Figure 19:
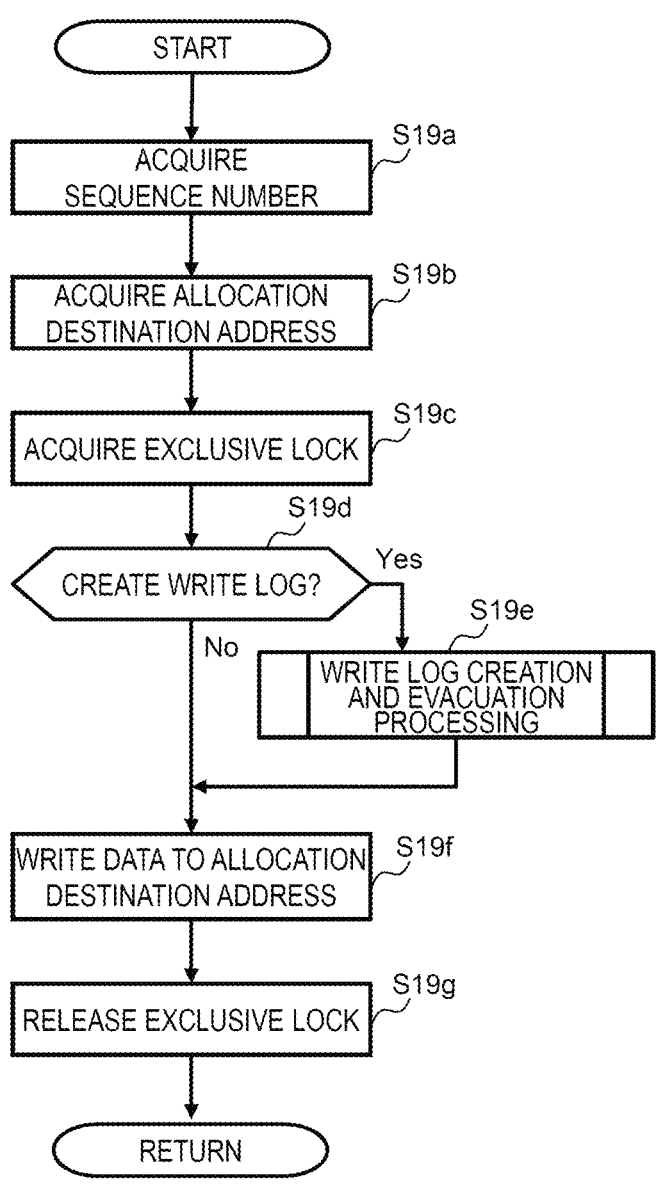
FIG. 19 is a flowchart showing a processing procedure of data write processing according to the first embodiment.

FIG. 19 is a flowchart showing a processing procedure of the data write processing 1097 according to the first embodiment.

First, the data protection controller 1086 acquires a sequence number of data storage area update (step S19*a*), acquires an allocation destination address (step S19*b*), and acquires an exclusive lock (step S19*c*).

Subsequently, the data protection controller 1086 determines whether write log creation is required (step S19*d*). When the write-back operation is determined in step S14 (FIG. 16) and the data is written as the cache log to the storage device 1033 in step S16, the data protection controller 1086 determines that write log creation is not required (step S19*d*; No). When the write-through operation is determined in step S14, or when the data is not written to the storage device 1033 as the cache log in step S16, it is determined that write log creation is required (step S19*d*; Yes). When it is determined that write log creation is required (step S19*d*; Yes), the data protection controller 1086 executes the write log creation and evacuation processing and writes the data to the write log storage area in the storage device 1033 (step S19*e*). Details of the write log creation and evacuation processing in step S19*e* will be described later with reference to FIG. 20.

Subsequently, after the data is written to the write log storage area, or when it is determined that write log creation is not required (step S19*d*; NO), the data protection controller 1086 writes the data to the allocation destination address on the data storage area 1203 (step S19*f*). When the data write is completed, the data protection controller 1086 releases the exclusive lock (step S19*g*) and ends the data write processing 1097.

Write Log Creation and Evacuation Processing According to First Embodiment

Figure 20:
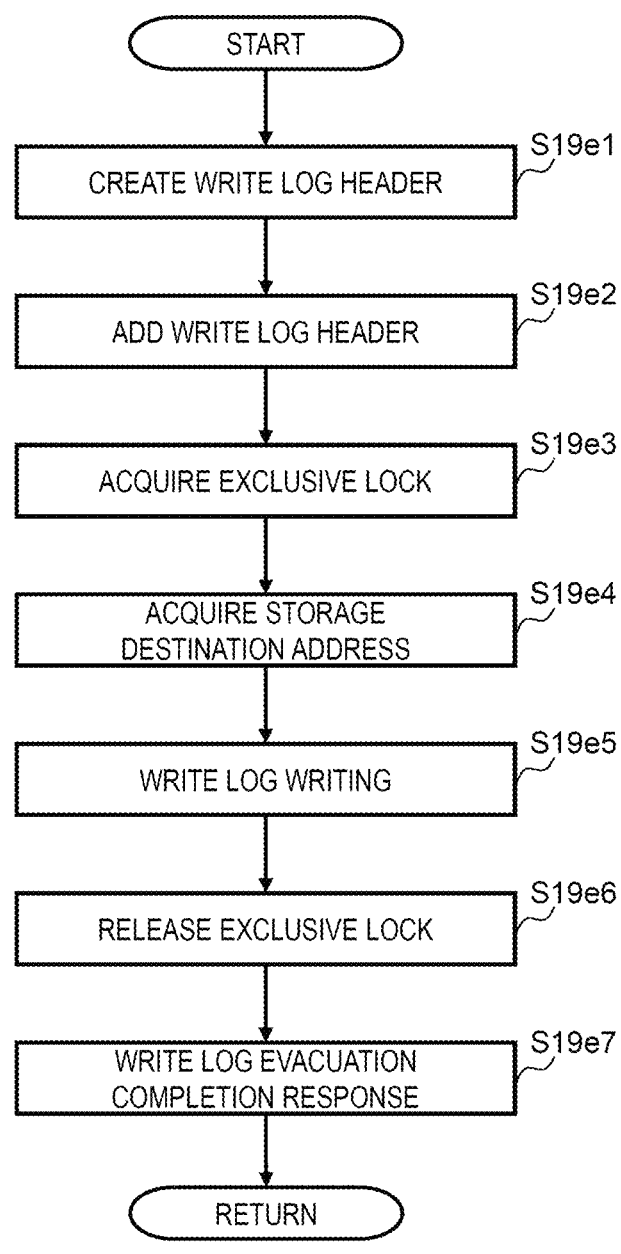
FIG. 20 is a flowchart showing a processing procedure of write log creation and evacuation processing according to the first embodiment.

FIG. 20 is a flowchart showing a processing procedure of the write log creation and evacuation processing according to the first embodiment. In this embodiment, the inside of the write log storage area 1022 on the storage device 1033 is divided into a plurality of areas, and one write log is stored in each of the divided areas.

The data protection controller 1086 writes created write logs to the storage device 1033 one by one. First, the data protection controller 1086 creates the write log header 1301 (step S19*e*1). Subsequently, the data protection controller 1086 adds the write log header 1301 to data received from a processing caller (step S19*e*2).

Subsequently, the data protection controller 1086 acquires an exclusive lock (step S19*e*3). Subsequently, the data protection controller selects 1086 one write destination area from the write log storage area management table 1105, acquires a start address of the area, and sets the start address as a storage destination address (step S19*e*4). Subsequently, the data protection controller 1086 writes a write log to the storage destination address (step S19*e*5). Subsequently, the data protection controller 1086 releases the exclusive lock (step S19*e*6). Subsequently, the data protection controller 1086 returns a completion response to the processing caller (step S19*e*7).

Power Loss Recovery Processing 1093 According to Fifth Embodiment

Figure 21:
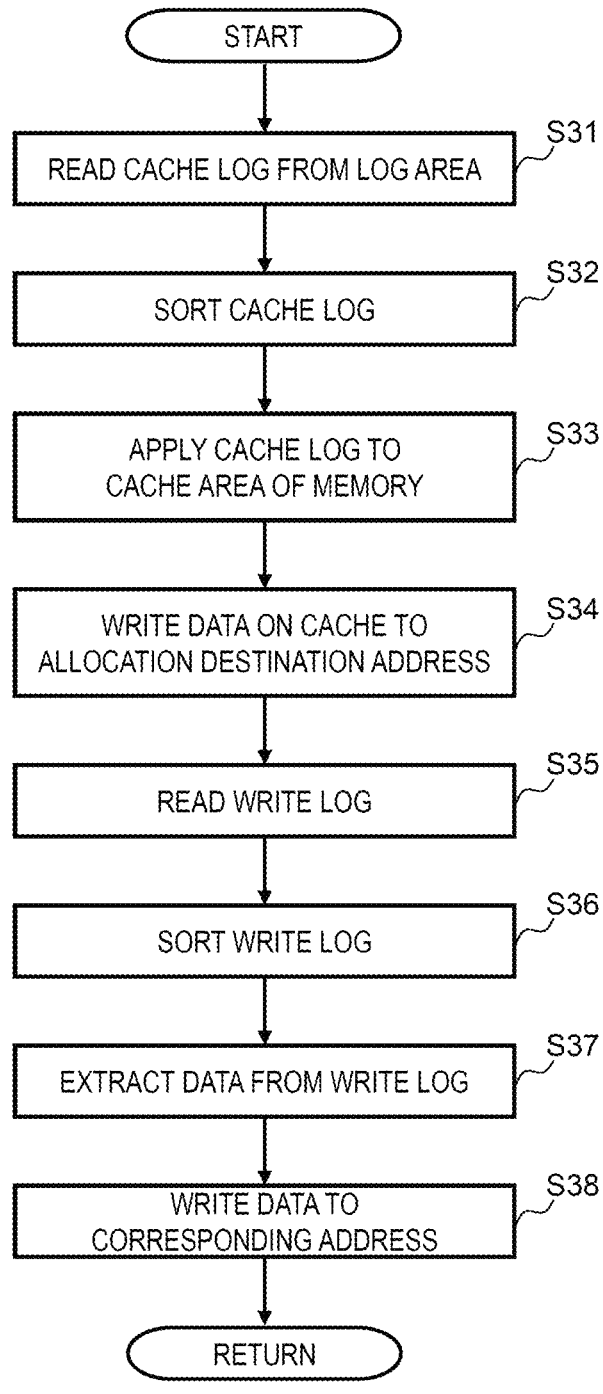
FIG. 21 is a flowchart showing a processing procedure of the power loss recovery processing at the time of power loss according to the first embodiment.

FIG. 21 is a flowchart showing a processing procedure of the power loss recovery processing 1093 at the time of power loss according to a fifth embodiment. FIG. 21 shows an example of processing when the storage system 100 performs recovery after power is lost during the write processing 1091.

First, the storage controller 1083 reads cache logs from the cache log storage area 1201 in the storage device 1033 (step S31). Subsequently, the storage controller 1083 sorts the logs read in step S31 in an order of the cache log sequence number (step S32). Subsequently, the storage controller 1083 applies the cache logs sorted in step S32 to the cache area 1102 on the memory 1032 (step S33). When applying the cache logs, the storage controller 1083 applies the logs to an address of a cache area described in an update address field in the cache log header 1401. Subsequently, the storage controller 1083 writes recovered data in the cache area 1102 to an allocation destination address of the storage device 1033 (step S34).

Subsequently, the storage controller 1083 reads write logs from the storage device 1033 (step S35). Subsequently, the storage controller 1083 sorts the read logs in an order of the write log sequence number (step S36). Subsequently, the storage controller 1083 extracts data from the write logs (step S37) and applies the data to the storage device 1033 in the sorted order (step S38). When applying the write logs, the storage controller 1083 writes the logs to an address on the data storage area 1203 described in the write destination address field of the write log header 1301.

Effects of First Embodiment

In the first embodiment, write and non-write of the write log are switched according to the selection of the write-back operation or the write-through operation. That is, during the write-back operation, the write log is not written when writing to the storage device 1033, and during the write-through operation, the write log is written when writing to the storage device 1033. Accordingly, it is possible to reduce the number of times of I/O of the back-end drive during the write-back operation, to improve performance during a drive bottleneck, and to reduce a CPU cost required for drive I/O.

In the first embodiment, at the time of recovery after power loss, the data in the cache area 1102 and the data storage area 1203 is restored from the data in the cache log storage area 1201, and the data in the data storage area 1203 is restored from the data in the write log storage area 1202. That is, in relation to the restoration of the data in the data storage area 1203, when the restoration can be performed from the data stored in the cache area 1102, the restoration is performed from the data in the cache area 1102. On the other hand, data that cannot be restored from the data in the cache area 1102 is restored from the write log stored in the write log storage area 1202. Accordingly, the number of times of write to the write log can be reduced by reducing a situation in which the write log is required.

Second Embodiment

In a second embodiment, a method is adopted in which one or more write logs are collectively written to the write log storage area on the storage device 1033 by append-write in write log creation and evacuation processing. In the present embodiment, instead of the write log creation and evacuation processing shown in FIG. 20, write log creation and evacuation processing shown in FIG. 22 is executed.

In the second embodiment, the same configuration and processing as those in the first embodiment are denoted by the same reference numerals, description thereof will be omitted, and differences therefrom will be mainly described.

Write Log Creation and Evacuation Processing According to Second Embodiment

Figure 22:
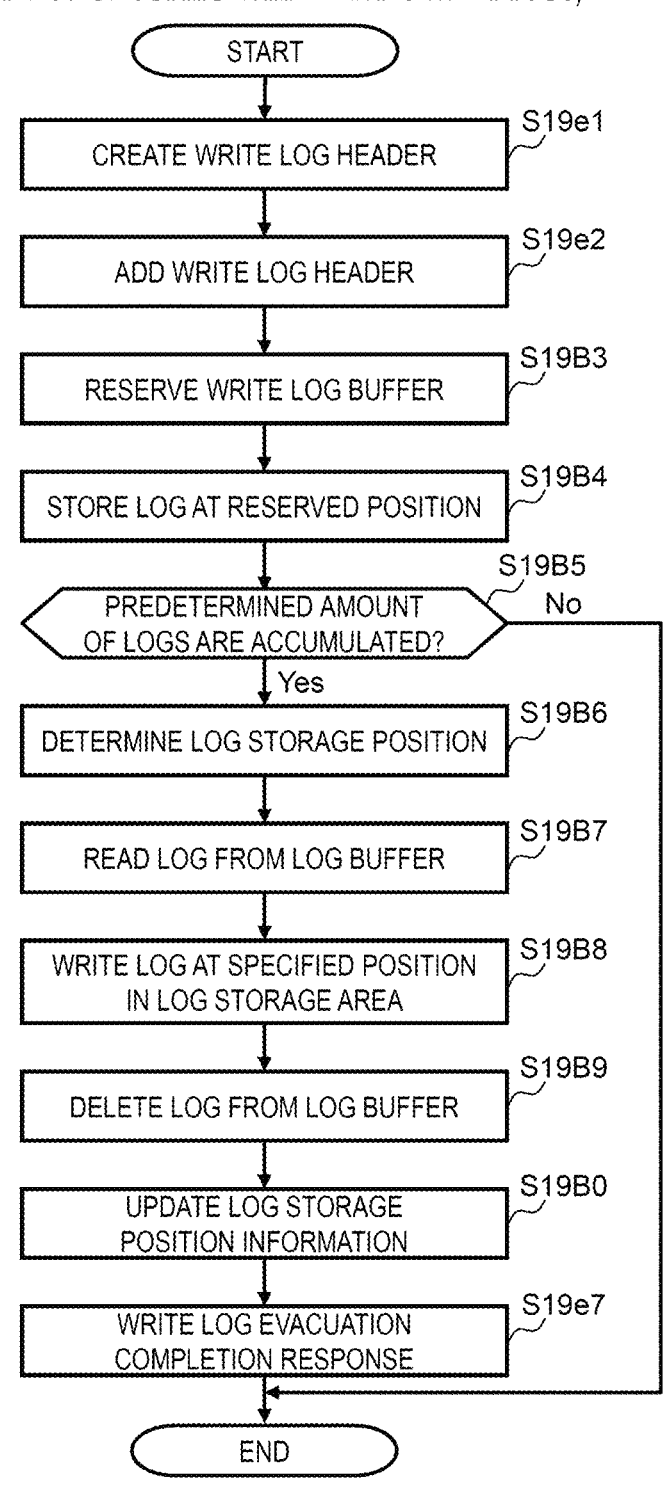
FIG. 22 is a flowchart showing a processing procedure of write log creation and evacuation processing according to a second embodiment.

FIG. 22 is a flowchart showing a processing procedure of the write log creation and evacuation processing according to the second embodiment. In the write log creation and evacuation: processing of this embodiment, the data protection controller 1086 collectively writes one or more created write logs to the storage device 1033.

In the write log creation and evacuation processing of the embodiment, steps S19e1 and S19e2 are the same as those in the first embodiment. Subsequent to step S19e2, the data protection controller 1086 reserves, on the write log buffer 1106, a storage area for data to which a write log header is added (step S19B3). Subsequently, the data protection controller 1086 stores a write log in the reserved area (step S19B4).

Next, the data protection controller 1086 verifies whether a total size of the write log on the write log buffer 1106 is equal to or larger than a predetermined size (step S19B5). When the total size of the write log is equal to or larger than the predetermined size (step S1985; Yes), the data protection controller 1086 selects one write log storage area as a write destination from the write log storage area management table 1105. Then, the data protection controller 1086 acquires a log end address of the selected write log storage area and sets the log end address as a storage destination address (step S19B6).

The data protection controller 1086 reads one or more write logs from the write log buffer 1106 (step S19B7). Subsequently, the data protection controller 1086 collectively writes the write logs to the acquired storage destination address (step S19B8). Subsequently, the data protection controller 1086 deletes, from the write log buffer 1106, a write log already written to the storage device (step S19B9). Then, the data protection controller 1086 updates the log end address of the write log storage area retained by the write log storage area management table 1105 to an address indicating an end position of the log written to the area (step S19B0). Next, the data protection controller 1086 returns a completion response to a processing caller (step S19e7).

After step S19e7 or when the total size of the write log on the write log buffer 1106 is smaller than the predetermined size (step S19B5; No), the data protection controller 1086 ends the write log creation and evacuation processing.

Effects of Second Embodiment

In the second embodiment, a predetermined number or a predetermined amount of write logs are collectively written to the write log storage area 1202. By collectively writing the write logs in this manner, it is possible to further reduce the number of times of drive I/O, improve performance at the time of a drive bottleneck, and reduce a CPU cost required for drive I/O.

Third Embodiment

In a third embodiment, a method of writing one or more write logs collectively with a cache log to the storage device 1033 in write log creation and evacuation processing is described. In this embodiment, instead of the write log creation and evacuation processing shown in FIG. 20, write log creation and evacuation processing shown in FIG. 23 is executed.

In the third embodiment, the same configuration and processing as those in the first and second embodiments are denoted by the same reference numerals, description thereof will be omitted, and differences therefrom will be mainly described.

Write Log Creation and Evacuation Processing According to Third Embodiment

Figure 23:
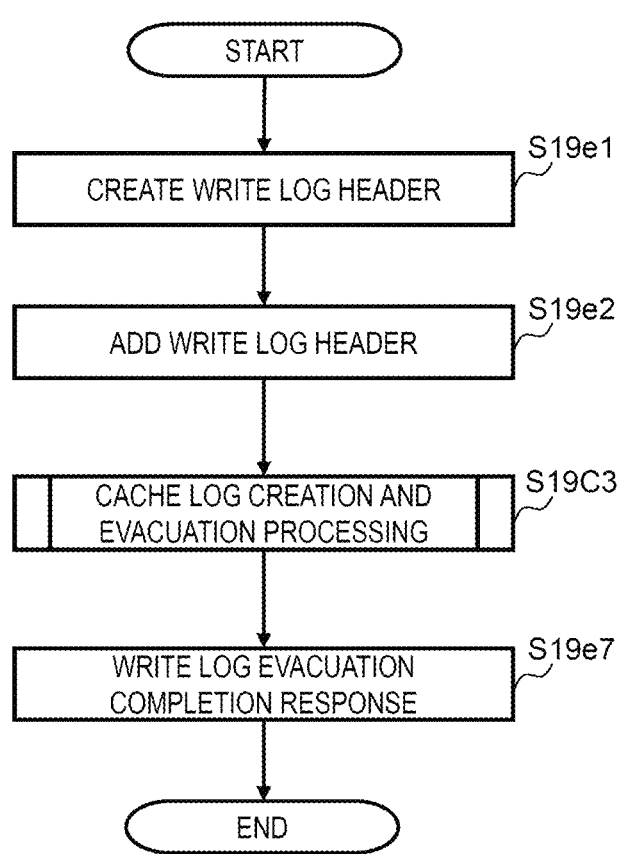
FIG. 23 is a flowchart showing a processing procedure of write log creation and evacuation processing according to a third embodiment.

FIG. 23 is a flowchart showing a processing procedure of the write log creation and evacuation processing according to the third embodiment.

In the write log creation and evacuation processing of the embodiment, steps S19e1 and S19e2 are the same as those in the first embodiment. Subsequent to step S19e2, the data protection controller 1086 sends data (write log) to which the write log header 1301 is added, and executes the cache log creation and evacuation processing 1092 (FIG. 18) (step S19C3). In step S19C3, a predetermined number or predetermined amount of write logs and a predetermined number or predetermined amount of cache logs are collectively written to a predetermined storage area in the storage device. Subsequently, the data protection controller 1086 returns a completion response (step S19e7).

Effects of Third Embodiment

In the third embodiment, updated contents (cache logs) of one or a plurality of cache areas 1102 and updated contents (write logs) of one or a plurality of data storage areas 1203 are collectively written to the predetermined storage area in the storage device 1033. Thus, processing related to writing of the cache log in steps S14 to S18 in the write processing 1091 (FIG. 16) can be omitted. By collectively writing the cache logs and the write logs to the storage device 1033 in this manner, it is possible to reduce the number of times of drive I/O, improve performance at the time of a drive bottleneck, and reduce a CPU cost required for drive I/O.

Fourth Embodiment

In the fourth embodiment, a protection code is assigned to target data to be written, and the data and the protection code are redundantly stored in their own storage node that is a redundancy source and another storage node that is a redundancy destination, or are distributed to three or more storage nodes constituting a storage cluster.

Configuration of Data Storage Area 1203 According to Fourth Embodiment

Figure 24:
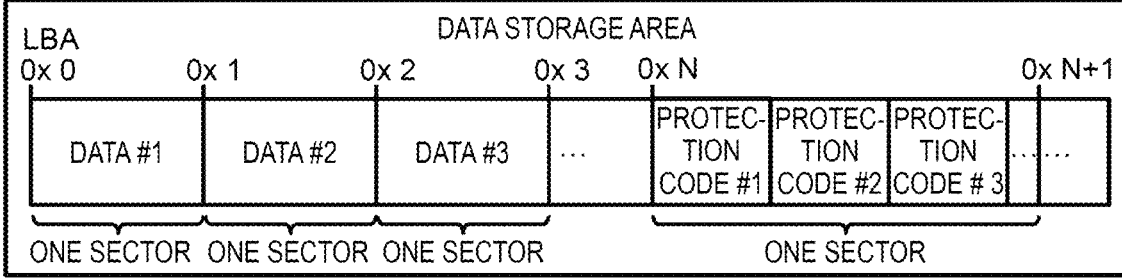
FIG. 24 shows a configuration example of a data storage area according to a fourth embodiment.

FIG. 24 shows a configuration example of the data storage area 1203 according to the fourth embodiment.

As methods for writing a protection code for detecting a data error to the data storage area 1203 together, there is "(B1) a method of storing data and a protection code thereof in the same sector" and "(B2) a method of collectively storing protection codes of a plurality of pieces of data in sectors different from the data". The "method of storing data and a protection code thereof in the same sector" is referred to as a same sector method. The "method of collectively storing protection codes of a plurality of pieces of data in sectors different from the data" is referred to as a separate method. Any method is applicable to the storage system 100.

In the "(B1) same sector method", the inside of the data storage area 1203 is divided in units of sectors as management units of the storage area, and each of the divided areas is provided to the data protection controller 1086 as a physical storage area where the data and the protection code can be collectively stored. Then, the storage controller 1083 calculates the protection code from data received from the host 101, and sends an I/O request to the data protection controller 1086. The data protection controller 1086 writes the data received from the storage controller 1083 and the protection code to a corresponding area on the storage device.

In the "(B2) separate method", each area obtained by dividing the inside of the data storage area 1203 in units of sectors as management units of the storage area is provided to the data protection controller 1086 as a data storage area and a protection code storage area for collectively storing protection codes. In the "(B2) separate method", protection codes of a plurality of pieces of data (hereinafter, a set of protection codes of the plurality of pieces of data is referred to as a "protection code group") are collectively stored in one sector.

Data is written to the storage device 1033 in units of sectors. Therefore, in the "(B2) separate method", when one protection code in the protection code group on the storage device 1033 is overwritten, the following steps are necessarily performed. That is, the data protection controller 1086 first reads an old protection code group from the storage device 1033. Next, the data protection controller 1086 updates a protection code portion corresponding to the data to create a new protection code group. Next, the data protection controller 1086 writes the created new protection code group to the storage device 1033.

The storage controller 1083 calculates the protection code from data received from the host 101, and sends an I/O request to the data protection controller 1086. The data protection controller 1086 writes the data to a corresponding area on the storage device 1033. Next, the data protection controller 1086 reads the old protection code group from the corresponding area on the storage device 1033 and overwrites the protection code group with the protection code received from the storage controller 1083 due to the above-described constraint on writing to the storage device 1033. Then, the data protection controller 1086 writes the new protection code group to the corresponding area on the storage device. An order of writing of the data and the protection code to the storage device may be reversed (writing of the protection code may be executed first) or writing of the data and the protection code may be executed concurrently.

Figure 25:
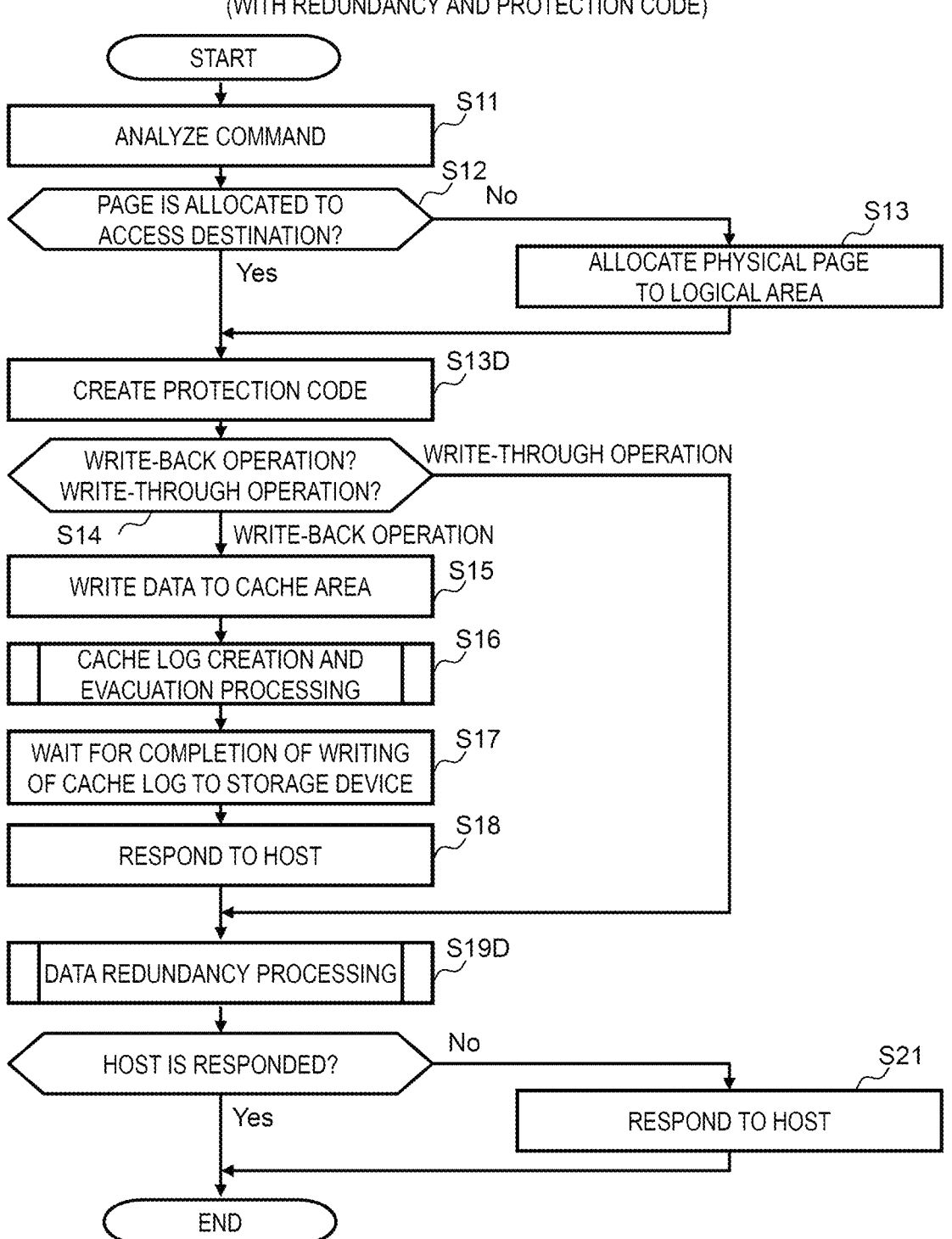
FIG. 25 is a flowchart showing a processing procedure of write processing according to the fourth embodiment.

In the fourth embodiment, write processing 1091 shown in FIG. 25 is executed instead of the write processing 1091 shown in FIG. 16. That is, the write processing 1091 of the embodiment is processing when a write request is issued from the host 101 to a virtual volume in which data is made redundant in two or more storage nodes 103. The virtual volume here is a virtual volume implemented by an area of a logical chunk corresponding to storage devices 1033 on two or more storage nodes 103. The write processing 1091 according to the embodiment is executed under an initiative of an active controller among a pair of storage controllers 1083. The data is provided with the protection code and stored in the storage devices 1033.

In the fourth embodiment, the same configuration and processing as those in the first, second, and third embodiments are denoted by the same reference numerals, description thereof will be omitted, and differences therefrom will be mainly described.

Write Processing 1091 According to Fourth Embodiment

FIG. 25 is a flowchart showing a processing procedure of the write processing 1091 according to the fourth embodiment. The write processing 1091 according to the fourth embodiment is different from the write processing 1091 according to the first embodiment (FIG. 16) in that step S14D is executed immediately before step S14. In addition, step S19D is executed immediately before step S18 and step S20. Other than these, the write processing 1091 according to the fourth embodiment is the same as the write processing 1091 according to the first embodiment.

In step S13D, the storage controller 1083 creates the protection code from the target data to be written. In step S19D, the storage controller 1083 executes the data redundancy processing 1096. Details of the data redundancy processing 1096 in step S19D will be described later with reference to FIG. 26.

Data Redundancy Processing 1096 According to Fourth Embodiment

Figure 26:
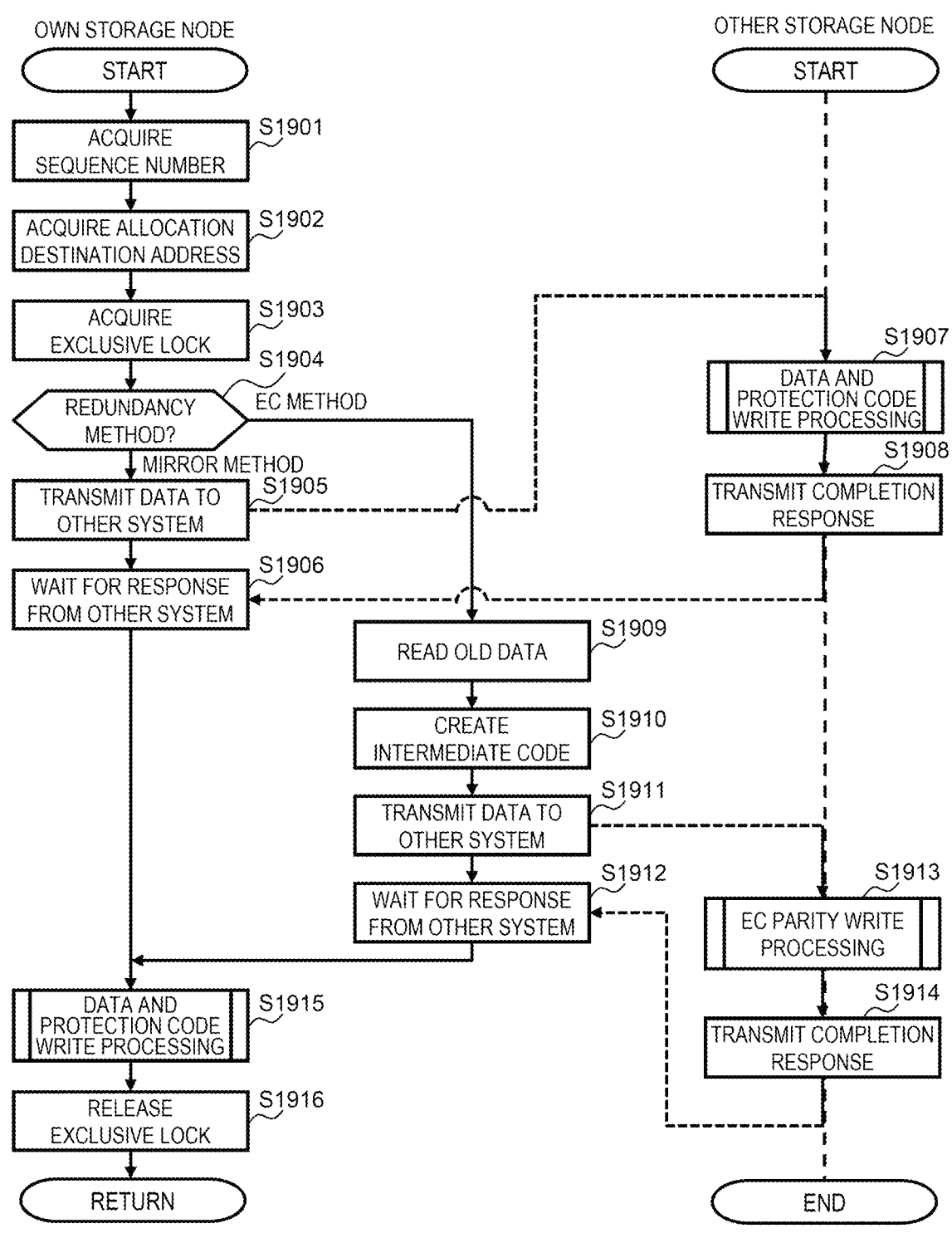
FIG. 26 is a flowchart showing a processing procedure of data redundancy processing according to the fourth embodiment.

FIG. 26 is a flowchart showing a processing procedure of the data redundancy processing 1096 according to the fourth embodiment.

By the data redundancy processing 1096 according to the fourth embodiment, the target data to be written is written to the storage device 1033 in its own storage node 103 and another storage node 103 that is a data redundancy destination.

First, the data protection controller 1086 acquires a sequence number of data storage area update (step S1901), acquires an allocation destination address (step S1902), and acquires an exclusive lock (step S1903).

Subsequently, the data protection controller 1086 determines a redundancy method of an I/O request destination area of the target data to be written (step S1904). When the redundancy method of the I/O request destination area of the data is a mirror method (step S1904; mirror method), the data protection controller 1086 transmits the data and the protection code to the other storage node 103 that is the redundancy destination of the data (step S1905). The data protection controller 1086 waits for a response to transmission of the data and the protection code in step S1905 from the other storage node 103 (step S1906).

Meanwhile, the data protection controller 1086 of the other storage node 103 that receives the data from the own storage node 103 that is the transmission source executes the data redundancy processing 1096 (step S1907) for the storage device 1033 on the other storage node. Details of data and protection code write processing in step S1917 will be described later with reference to FIG. 27. Then, in the same manner as in step S17, the data protection controller 1086 of the other storage node 103 transmits a response to the storage node 103 that is the transmission source of the data (step S1908).

On the other hand, when the redundancy method is the EC method (step S1904; EC method), the data protection controller 1086 reads old data before updating from the allocation destination address of the storage device 1033 in its own storage node 103 (step S1909). Subsequently, the data protection controller 1086 creates intermediate parity (intermediate code) from the target data to be written and the old data read in step S1909 (step S1910). Subsequently, the data protection controller 1086 transmits the intermediate parity to the other storage node 103 serving as the data redundancy destination (step S1911), and waits for a response from the other storage node 103 (step S1912).

The data protection controller 1086 of the other storage node 103 that receives the intermediate parity executes EC parity write processing (step S1913) and transmits a response to the storage node 103 that is a transmission source of the intermediate parity (step S1914). Details of the EC parity write processing in step S1913 will be described later with reference to FIG. 28.

After receiving the response in step S1906 or after receiving the response in step S1912, the data protection controller 1086 executes data and protection code write processing (step S1915) for the storage device 1033 on its own storage node 103. Details of the data and protection code write processing in step S1915 will be described later with reference to FIG. 27.

Subsequently, the data protection controller 1086 releases the exclusive lock (step S1916) and ends the data redundancy processing 1096.

Data and Protection Code Write Processing According to Fourth Embodiment

Figure 27:
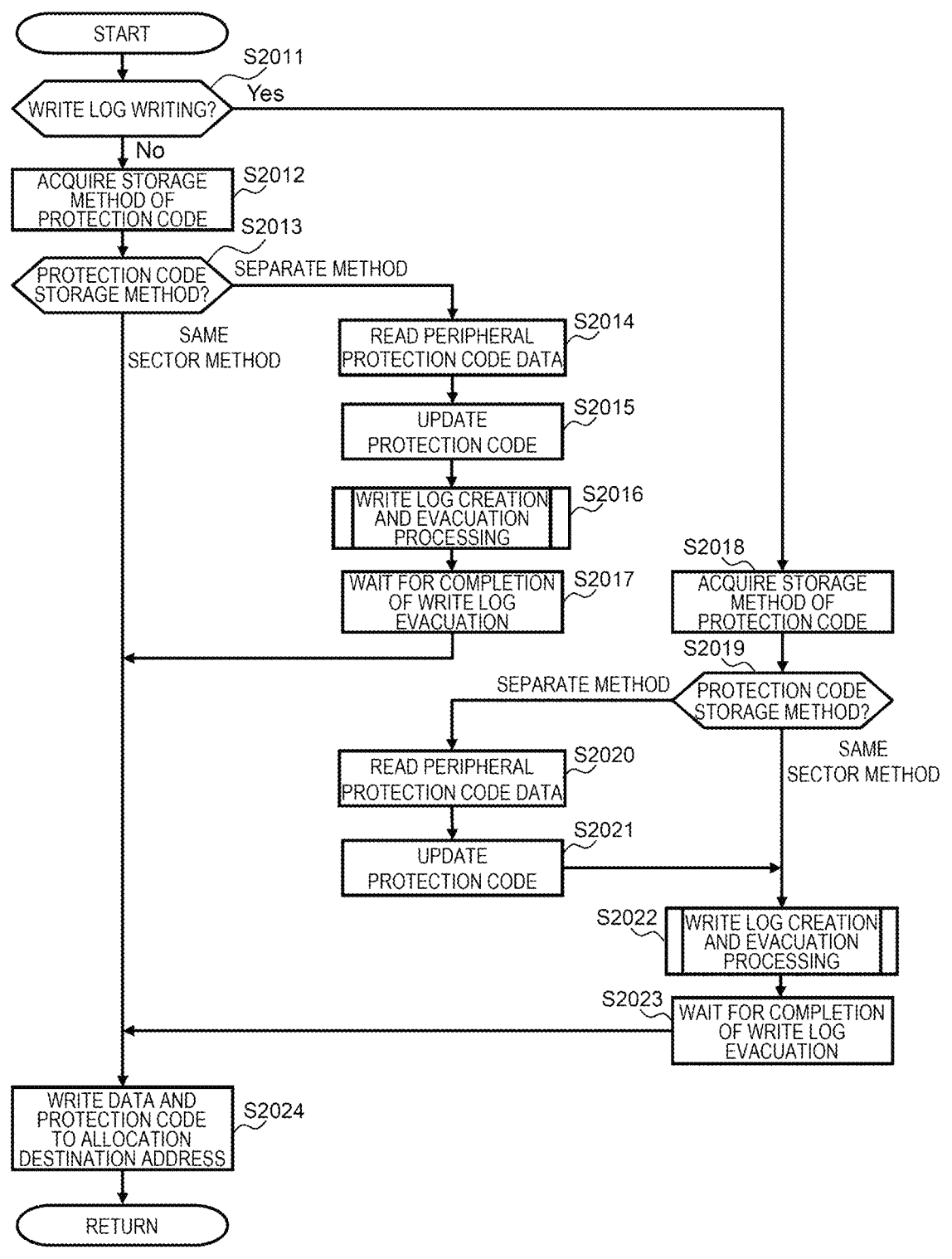
FIG. 27 is a flowchart showing a processing procedure of data and protection code write processing according to the fourth embodiment.

In FIG. 27, when the write-back operation is determined in S14 in FIG. 25 in the fourth embodiment and the data is written as the cache log in the storage device 1033 in S16, it is determined that write log creation is not required (step S2011; No). When the write-through operation is determined in S14 in FIG. 25 and the data is not written to the storage device 1033 as the cache log, it is determined that write log creation is required (step S2011; Yes).

First, when it is determined that write log creation of the data is not required in step S2001 (step S2001; No), the data protection controller 1086 acquires a storage method of the protection code of the storage device (step S2012). When the protection code storage method is the separate method (step S2013; separate method), the data protection controller 1086 writes the target protection code group to be updated to the storage device 1033 as the write log. Specifically, the data protection controller 1086 reads, from the storage device 1033, a protection code group including the protection code of the target data to be updated (step S2014), and updates the protection code of the target data to be updated in the protection code group (step S2015). Subsequently, the data protection controller 1086 writes a new protection code group to the storage device 1033 through the write log creation and evacuation processing (step S2016), and waits for completion thereof (step S2017).

On the other hand, when it is determined in step S2011 that write log creation is required (step S2011; Yes), the data protection controller 1086 writes the data and the protection code as the write log to the storage device 1033. Specifically, the data protection controller 1086 acquires the storage method of the protection code of the storage device 1033 (step S2018).

Subsequently, the data protection controller 1086 determines the protection code storage method (step S2019). Subsequently, when the protection code storage method is the separate method (step S2019; separate method), the data protection controller 1086 reads, from the storage device 1033, the protection code group including the protection code of the target data to be updated (step S2020). Subsequently, the data protection controller 1086 updates the protection code of the target data to be updated in the protection code group read in step S2020 (step S2021). Subsequently, the data protection controller 1086 converts a new protection code group updated in step S2021 and the data into the write log and writes the write log to the storage device 1033 through the write log creation and evacuation processing (step S2022). Then, the data protection controller 1086 waits for completion of writing in step S2022 (step S2023). When step S2023 is ended, the data protection controller 1086 proceeds to step S2024.

On the other hand, when the protection code storage method is the same sector method (step S2019; same sector method), the data protection controller 1086 proceeds to step S2022.

The write log creation and evacuation processing in steps S2016 and S2022 may use any one of the methods described with reference to FIGS. 20, 22, and 23.

On the other hand, when the data is made non-volatile and the protection code storage method is the same sector method (step S2013; same sector method), the data protection controller 1086 proceeds to step S2024. The data protection controller 1086 also proceeds to step S2024 when a completion response is received while waiting for completion of write log evacuation processing (step S2023). In step S2024, the target data to be written and the protection code are written to the allocation destination address on the storage device 1033.

EC Parity Write Processing According to Fourth Embodiment

Figure 28:
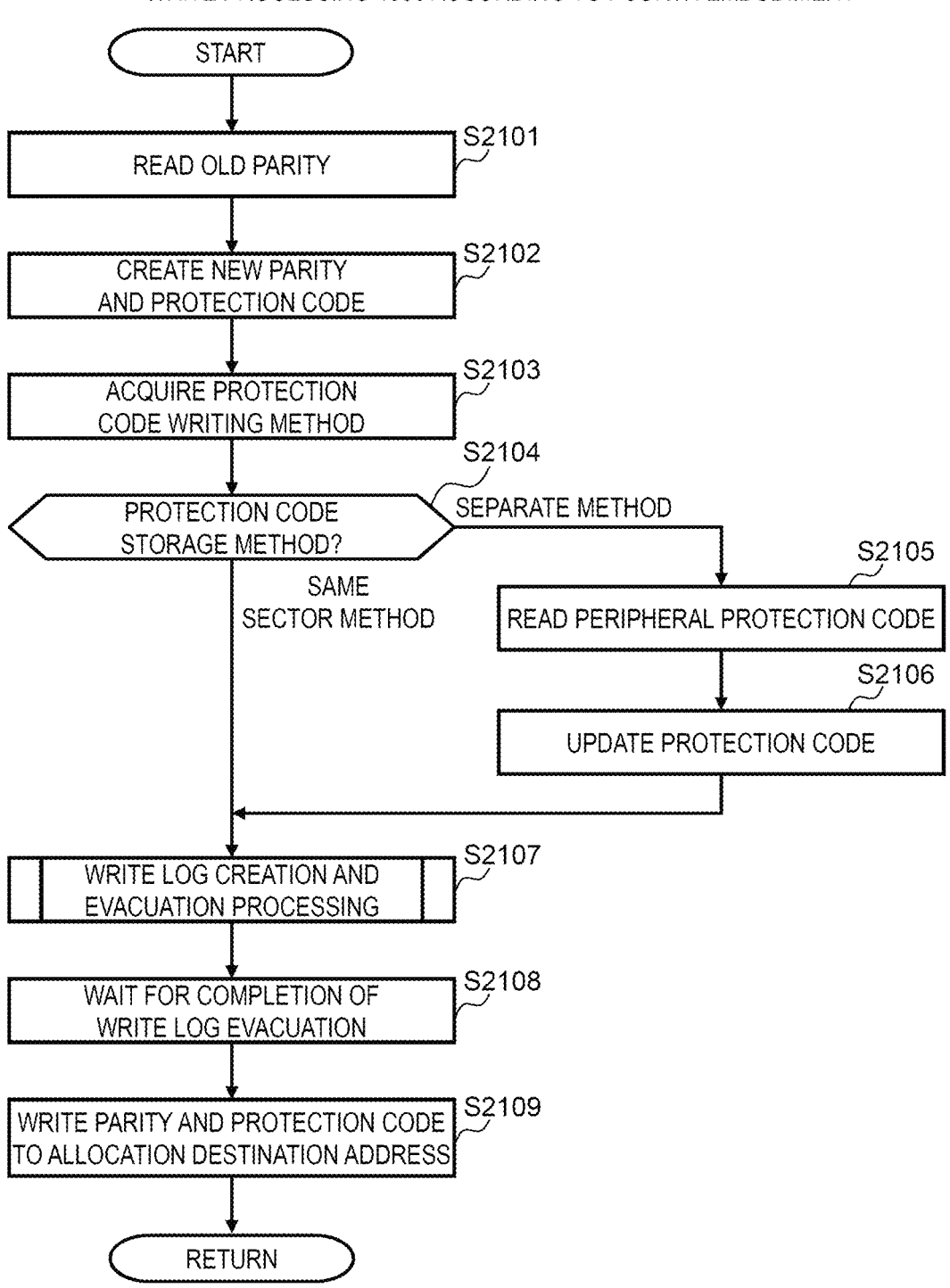
FIG. 28 is a flowchart showing a processing procedure of EC parity write processing according to the fourth embodiment.

FIG. 28 is a flowchart showing a processing procedure of the EC parity write processing according to the fourth embodiment. In the EC parity write processing, the parity and the protection code of the parity are written to the storage device 1033 as a log, and then the parity and the protection code of the parity are written to the allocation destination address of the data storage area 1203.

First, the data protection controller 1086 reads old parity from the allocation destination address (step S2101). Subsequently, the data protection controller 1086 creates new parity from the old parity and the intermediate parity, and creates a protection code from the new parity (step S2102).

Subsequently, the data protection controller 1086 acquires the storage method of the protection code of the storage device (step S2103). Subsequently, the data protection controller 1086 determines the protection code storage method. When the protection code storage method is the separate method (step S2104; separate method), the data protection controller 1086 writes a protection code group including the target protection code to be updated this time to the storage device 1033 as a write log. Specifically, the data protection controller 1086 reads, from the storage device 1033, the protection code group including the protection code of the target data to be updated (step S2105). Subsequently, the data protection controller 1086 updates the protection code of the target data to be updated in the protection code group (step S2106). When step S2106 is ended, the data protection controller 1086 proceeds to step S2107.

When the protection code storage method is the same sector method (step S2404; same sector method) or after completion of step S2106, the data protection controller 1086 executes the write log creation and evacuation processing (step S2107). In the write log creation and evacuation processing, the parity and the new protection code group are converted into a write log and written to the storage device 1033. Subsequently, the data protection controller 1086 waits for completion of the write log evacuation in step S2107 (step S2108). The write log creation and evacuation processing in step S2107 may use any one of the methods described with reference to FIGS. 20, 22, and 23.

Subsequently, when a completion response is received while waiting for completion of write log evacuation processing (step S2108), the data protection controller 1086 writes the parity and the protection code to the allocation destination address on the storage device 1033 (step S2109).

Effects of Fourth Embodiment

In the fourth embodiment, write and non-write of the write log are switched according to selection of the write-back operation or the write-through operation for the data for which the write request is received from the host 101 and the protection code thereof. Thus, even when the protection code is added to the data, the number of times of write to the write log can be reduced.

In the fourth embodiment, by writing the protection code assigned to the target data to be written to the same sector as the data, it is possible to reduce the number of times of I/O by restricting I/O to only reading the sector related to the storage of the data, and thus a decrease in I/O performance can be prevented.

In the fourth embodiment, by writing the protection code assigned to the target data to be written to a sector different from the data, the number of times of sector reading of the protection code group is restricted to reduce the number of times of I/O when updating a plurality of pieces of data, and thus it is possible to prevent a decrease in I/O performance.

In the fourth embodiment, when the redundancy method is the mirror method, the target data to be written and the protection code thereof are made redundant between the storage node 103 that is the redundancy source and the other storage node 103 that is the redundancy destination. With this configuration, each storage node 103 switches between writing and non-writing of the write log depending on which of the write-back operation and the write-through operation is selected. Accordingly, even in a data redundancy configuration of the mirror method, in each storage node 103, it is possible to reduce the number of times of drive I/O, improve performance at the time of a drive bottleneck, and reduce a CPU cost required for drive I/O.

In the fourth embodiment, when the redundancy method is the EC method, the EC parity of the target data to be written is distributed between the own storage node 103 that is the redundancy source and two or more other storage nodes 103 that are redundancy destinations. With this configuration, each storage node 103 switches between writing and non-writing of the write log depending on which of the write-back operation and the write-through operation is selected. Accordingly, even in a data redundancy configuration of the EC method, in each storage node 103, it is possible to reduce the number of times of drive I/O, improve performance at the time of a drive bottleneck, and reduce a CPU cost required for drive I/O.

The invention is not limited to the above-described embodiments, and includes various modifications. The embodiments described above have been described in detail to describe the invention in an easy-to-understand manner, and the invention is not necessarily limited to including all the described configurations. In addition, the configurations may not only be deleted, but also be replaced or added. Embodiments of the invention also include aspects in which a part or all of the above-described embodiments are appropriately combined to be consistent.

A part or all of the configurations, functions, processing units, processing methods, and the like described above may be implemented by hardware by, for example, designing with an integrated circuit. The invention can also be implemented by a program code of software for implementing the functions of the embodiments. In this case, a recording medium recording the program code is provided to a computer, and a processor provided in the computer reads the program code stored in the recording medium.

In this case, the program code read from the recording medium implements the functions of the embodiments described above by itself, and the program code itself and the recording medium storing the program code implement the invention. Examples of the recording medium for supplying such a program code include a flexible disk, a CD-ROM, a DVD-ROM, a hard disk, a solid state drive (SSD), an optical disk, a magneto-optical disk, a CD-R, a magnetic tape, a non-volatile memory card, and a ROM.

Further, the program code for implementing the functions described in the embodiments can be implemented in a wide range of programs or script languages such as Assembler, C/C++, Perl, Shell, PHP, and Java (registered trademark).

Control lines and information lines considered to be necessary for description are shown in the embodiments described above, and not all control lines and information lines are necessarily shown in a product. All the configurations may be connected.

What is claimed is:

1. A storage system comprising:

one or a plurality of storage nodes each including a non-volatile storage device, a storage controller configured to process reading and writing of data from and to the storage device, and a volatile memory, wherein the memory has a cache area where data related to a write request from a higher-level apparatus is temporarily stored, the storage device has a cache log storage area where an updated content of the cache area is stored, a data storage area where the data related to the write request is permanently stored, and a write log storage area where an updated content of the data storage area is stored, the storage controller switches between a write-back operation and a write-through operation, the write-back operation being an operation in which the data related to the write request is stored in the cache area and the cache log storage area, then the higher-level apparatus is responded to, and the data is written to the data storage area after the response, and the write-through operation being an operation in which the data is written to the data storage area and then the higher-level apparatus is responded to, and in the write-back operation, writes the data to the data storage area without writing the updated content of the data storage area to the write log storage area, and in the write-through operation, writes the data to the data storage area after writing the updated content of the data storage area to the write log storage area.

2. The storage system according to claim 1, wherein when power loss occurs in the storage system during a period from the response to the writing of the data to the data storage area, in recovery processing of the power loss, the storage controller reads the updated content of the cache area from the cache log storage area of the storage device to restore data in the cache area of the memory and writes the restored data to the data storage area in a case of the write-back operation, and reads the updated content of the data storage area from the write log storage area to apply the updated content to the data storage area in a case of the write-through operation.

3. The storage system according to claim 1, wherein the storage controller upon receiving the write request, adds a protection code for error detection to the data related to the write request, in the write-back operation, stores the data and the protection code in the cache area and the cache log storage area, and then writes the data and the protection code to the data storage area, and in the write-through operation, writes the updated content of the data storage area to the write log storage area, and then writes the data and the protection code to the data storage area.

4. The storage system according to claim 3, wherein the storage controller divides an area in the storage device and a storage area corresponding to the area and provided to the higher-level apparatus into sectors as minimum write units, and writes the protection code and the corresponding data to the same sector in the data storage area.

5. The storage system according to claim 3, wherein an area in the storage device and a storage area corresponding to the area and provided to the higher-level apparatus are divided into sectors as minimum write units, and the protection code and the corresponding data are written to different sectors in the data storage area.

6. The storage system according to claim 3, wherein the storage controller divides an area in the storage device and a storage area corresponding to the area and provided to the higher-level apparatus into sectors as minimum write units, groups a plurality of the protection codes related to a plurality of pieces of the data of a plurality of sectors into a protection code group, and reads, when writing the data to a sector of the data storage area, the protection code group including the protection code of the data to be written from the data storage area, overwrites the protection code of the protection code group, writes the overwritten protection code to the write log storage area, and then writes the protection code group including the overwritten protection code to the data storage area.

7. The storage system according to claim 1, wherein the storage controller collectively writes, to the write log storage area, the updated content of the data storage area related to a plurality of the write requests.

8. The storage system according to claim 1, wherein the storage controller collectively writes, to the storage device, the updated content of the data storage area and the updated content of one or more of the cache areas related to a plurality of the write requests.

9. The storage system according to claim 1, wherein the storage controller of one of the storage nodes that receives the write request from the higher-level apparatus transfers the data related to the write request to another storage node constituting the storage system, the storage controller of the storage node that receives the transferred data switches between a write-back operation and a write-through operation, the write-back operation being an operation in which the transferred data is stored in the cache area and the cache log storage area, then the higher-level apparatus is responded to, and the data is written to the data storage area after the response, and the write-through operation being an operation in which the data is written to the data storage area and then the higher-level apparatus is responded to, and in the write-back operation, writes the data to the data storage area without writing the updated content of the data storage area to the write log storage area, and in the write-through operation, writes the data to the data storage area after writing the updated content of the data storage area to the write log storage area.

10. The storage system according to claim 1, wherein parity related to the data is stored in a storage node different from the storage node that stores the data, the storage controller of one of the storage nodes that receives the write request from the higher-level apparatus reads, from the data storage area, old data to be updated by new data related to the write request, creates an intermediate code from the new data and the old data, and transfers the intermediate code to another storage node that constitutes the storage system and stores the parity, and the storage controller of the other storage node that receives the intermediate code reads old parity on the data storage area, creates new parity from the intermediate code and the old parity, writes the new parity to the write log storage area, and then writes the new parity to the data storage area.

11. A control method for a storage system that includes one or a plurality of storage nodes each including a storage controller configured to process reading and writing of data, and a volatile memory, wherein the memory has a cache area where data related to a write request from a higher-level apparatus is temporarily stored, a non-volatile storage device has a cache log storage area where an updated content of the cache area is stored, a data storage area where the data related to the write request is permanently stored, and a write log storage area where an updated content of the data storage area is stored, the storage controller switches between a write-back operation and a write-through operation, the write-back operation being an operation in which the data related to the write request is stored in the cache area and the cache log storage area, then the higher-level apparatus is responded to, and the data is written to the data storage area after the response, and the write-through operation being an operation in which the data is written to the data storage area and then the higher-level apparatus is responded to, and in the write-back operation, writes the data to the data storage area without writing the updated content of the data storage area to the write log storage area, and in the write-through operation, writes the data to the data storage area after writing the updated content of the data storage area to the write log storage area.

\*　　\*　　\*　　\*　　\*